(12) United States Patent
Balle et al.

(10) Patent No.: US 10,963,176 B2
(45) Date of Patent: Mar. 30, 2021

(54) TECHNOLOGIES FOR OFFLOADING ACCELERATION TASK SCHEDULING OPERATIONS TO ACCELERATOR SLEDS

(71) Applicant: Intel Corporation, Santa Clara, CA (US)

(72) Inventors: Susanne M. Balle, Hudson, NH (US); Francesc Guim Bernat, Barcelona (ES); Slawomir Putyrski, Gdynia (PL); Joe Grecco, Saddle Brook, NJ (US); Henry Mitchel, Wayne, NJ (US); Rahul Khanna, Portland, OR (US); Evan Custodio, Seekonk, MA (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 15/721,821

(22) Filed: Sep. 30, 2017

(65) Prior Publication Data

US 2018/0150298 A1    May 31, 2018

Related U.S. Application Data

(60) Provisional application No. 62/427,268, filed on Nov. 29, 2016.

(30) Foreign Application Priority Data

Aug. 30, 2017    (IN) .............................. 201741030632

(51) Int. Cl.
*G06F 9/48*    (2006.01)
*G06F 3/06*    (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
None
See application file for complete search history.

(56) References Cited

U.S. PATENT DOCUMENTS 9,026,765 B1 *  5/2015  Marshak ................. G06F 3/061
                                                        711/114
10,034,407 B2 *  7/2018  Miller ................... H04L 9/3263
(Continued)

OTHER PUBLICATIONS

Artail et al. "Speedy Cloud: Cloud Computing with Support for Hardware Acceleration Services", 2017 IEEE, pp. 850-865.*
(Continued)

*Primary Examiner* — Van H Nguyen
(74) *Attorney, Agent, or Firm* — Compass IP Law PC

(57) ABSTRACT

Technologies for offloading acceleration task scheduling operations to accelerator sleds include a compute device to receive a request from a compute sled to accelerate the execution of a job, which includes a set of tasks. The compute device is also to analyze the request to generate metadata indicative of the tasks within the job, a type of acceleration associated with each task, and a data dependency between the tasks. Additionally the compute device is to send an availability request, including the metadata, to one or more micro-orchestrators of one or more accelerator sleds communicatively coupled to the compute device. The compute device is further to receive availability data from the one or more micro-orchestrators, indicative of which of the tasks the micro-orchestrator has accepted for acceleration on the associated accelerator sled. Additionally, the compute device is to assign the tasks to the one or more micro-orchestrators as a function of the availability data.

28 Claims, 23 Drawing Sheets

(51) Int. Cl.
G06F 16/174 (2019.01)
G06F 21/57 (2013.01)
G06F 21/73 (2013.01)
G06F 8/65 (2018.01)
H04L 12/24 (2006.01)
H04L 29/08 (2006.01)
G06F 11/30 (2006.01)
G06F 9/50 (2006.01)
H01R 13/453 (2006.01)
H03M 7/30 (2006.01)
H03M 7/40 (2006.01)
H04L 12/26 (2006.01)
H04L 12/813 (2013.01)
H04L 12/851 (2013.01)
G06F 11/07 (2006.01)
G06F 11/34 (2006.01)
G06F 7/06 (2006.01)
G06T 9/00 (2006.01)
H03M 7/42 (2006.01)
H04L 12/28 (2006.01)
H04L 12/46 (2006.01)
H04L 29/12 (2006.01)
G06F 13/16 (2006.01)
G06F 21/62 (2013.01)
G06F 21/76 (2013.01)
H03K 19/173 (2006.01)
H04L 9/08 (2006.01)
H04L 12/933 (2013.01)
G06F 9/38 (2018.01)
G06F 12/02 (2006.01)
G06F 12/06 (2006.01)
G06T 1/20 (2006.01)
G06T 1/60 (2006.01)
G06F 9/54 (2006.01)
G06F 8/656 (2018.01)
G06F 8/658 (2018.01)
G06F 8/654 (2018.01)
G06F 9/4401 (2018.01)
H01R 13/631 (2006.01)
H05K 7/14 (2006.01)
H04L 12/911 (2013.01)
G06F 11/14 (2006.01)
H04L 29/06 (2006.01)
G06F 15/80 (2006.01)

(52) U.S. Cl.
CPC ............ G06F 3/067 (2013.01); G06F 3/0608
(2013.01); G06F 3/0611 (2013.01); G06F
3/0613 (2013.01); G06F 3/0617 (2013.01);
G06F 3/0647 (2013.01); G06F 3/0653
(2013.01); G06F 7/06 (2013.01); G06F 8/65
(2013.01); G06F 8/654 (2018.02); G06F
8/656 (2018.02); G06F 8/658 (2018.02);
G06F 9/3851 (2013.01); G06F 9/3891
(2013.01); G06F 9/4401 (2013.01); G06F
9/4881 (2013.01); G06F 9/505 (2013.01);
G06F 9/5005 (2013.01); G06F 9/5038
(2013.01); G06F 9/544 (2013.01); G06F
11/0709 (2013.01); G06F 11/079 (2013.01);
G06F 11/0751 (2013.01); G06F 11/3006
(2013.01); G06F 11/3034 (2013.01); G06F
11/3055 (2013.01); G06F 11/3079 (2013.01);
G06F 11/3409 (2013.01); G06F 12/0284
(2013.01); G06F 12/0692 (2013.01); G06F
13/1652 (2013.01); G06F 16/1744 (2019.01);
G06F 21/57 (2013.01); G06F 21/6218
(2013.01); G06F 21/73 (2013.01); G06F
21/76 (2013.01); G06T 1/20 (2013.01); G06T
1/60 (2013.01); G06T 9/005 (2013.01); H01R
13/453 (2013.01); H01R 13/4536 (2013.01);
H01R 13/4538 (2013.01); H01R 13/631
(2013.01); H03K 19/1731 (2013.01); H03M
7/3084 (2013.01); H03M 7/40 (2013.01);
H03M 7/42 (2013.01); H03M 7/60 (2013.01);
H03M 7/6011 (2013.01); H03M 7/6017
(2013.01); H03M 7/6029 (2013.01); H04L
9/0822 (2013.01); H04L 12/2881 (2013.01);
H04L 12/4633 (2013.01); H04L 41/044
(2013.01); H04L 41/0816 (2013.01); H04L
41/0853 (2013.01); H04L 41/12 (2013.01);
H04L 43/04 (2013.01); H04L 43/06 (2013.01);
H04L 43/08 (2013.01); H04L 43/0894
(2013.01); H04L 47/20 (2013.01); H04L
47/2441 (2013.01); H04L 49/104 (2013.01);
H04L 61/2007 (2013.01); H04L 67/10
(2013.01); H04L 67/1014 (2013.01); H04L
67/327 (2013.01); H04L 67/36 (2013.01);
H05K 7/1452 (2013.01); H05K 7/1487
(2013.01); G06F 11/1453 (2013.01); G06F
12/023 (2013.01); G06F 15/80 (2013.01);
G06F 2212/401 (2013.01); G06F 2212/402
(2013.01); G06F 2221/2107 (2013.01); H04L
41/046 (2013.01); H04L 41/0896 (2013.01);
H04L 41/142 (2013.01); H04L 47/78
(2013.01); H04L 63/1425 (2013.01)

(56) References Cited

U.S. PATENT DOCUMENTS

| 10,045,098 | B2* | 8/2018 | Adiletta | G06F 3/0688 |
| 10,085,358 | B2* | 9/2018 | Adiletta | H04L 49/25 |
| 2010/0191823 | A1 | 7/2010 | Archer et al. | |
| 2012/0054770 | A1 | 3/2012 | Krishnamurthy et al. | |
| 2013/0179485 | A1 | 7/2013 | Chapman et al. | |
| 2013/0232495 | A1 | 9/2013 | Rossbach et al. | |
| 2015/0007182 | A1 | 1/2015 | Rossbach et al. | |
| 2017/0046179 | A1 | 2/2017 | Teh et al. | |
| 2017/0116004 | A1 | 4/2017 | Devegowda et al. | |
| 2017/0317945 | A1 | 11/2017 | Guo et al. | |
| 2018/0077235 | A1* | 3/2018 | Nachimuthu | H04L 47/70 |
| 2018/0150299 | A1 | 5/2018 | Balle et al. | |
| 2018/0150330 | A1 | 5/2018 | Bemat et al. | |
| 2019/0065281 | A1 | 2/2019 | Bemat et al. | |

OTHER PUBLICATIONS

Asiatici et al. "Virtualized Execution Runtime for FPGA Accelerators in the Cloud", 2017 IEEE, pp. 1900-1910.*

Ding et al. "A Unified OpenCL-flavor Programming Model with Scalable Hybrid Hardware Platform on FPGAs", 2014 IEEE, 7 pages.*

Fahmy et al. "Virtualized FPGA Accelerators for Efficient Cloud Computing", 2015 IEEE, pp. 430-435.*

Diamantopoulos et al. "High-level Synthesizable Dataflow MapReduce Accelerator for FPGA-coupled Data Centers", 2015 IEEE, pp. 1-8.*

Caulfield et al, A Cloud-scale acceleration Architecture, Microsoft Corp, Oct. 2016, 13 pages.

* cited by examiner

US 10,963,176 B2

TECHNOLOGIES FOR OFFLOADING ACCELERATION TASK SCHEDULING OPERATIONS TO ACCELERATOR SLEDS

CROSS-REFERENCE TO RELATED APPLICATIONS

The present application claims the benefit of U.S. Provisional Patent Application No. 62/427,268, filed Nov. 29, 2016, and Indian Provisional Patent Application No. 201741030632, filed Aug. 30, 2017.

BACKGROUND

Typically, in systems in which workloads are distributed among multiple compute devices (e.g., in a data center), a centralized server may track the utilization of each compute device, maintain a database of the features of each compute device (e.g., processing power, ability to accelerate certain types of tasks, etc.), and match the workloads to compute devices as a function of the loads on the compute devices (e.g., to avoid overloading a compute device) and as a function of the feature sets of the compute devices (e.g., assigning a cryptographic workload to a compute device with specialized circuitry for accelerating the execution of cryptographic operations). However, tracking the available features and the loads on the compute devices may be taxing on the centralized server, especially as the number compute devices and workloads in the data center increases.

To compensate for the relatively heavy processing load, the centralized server may make scheduling decisions using a reduced set of information and/or a less complex scheduling process, to maintain the ability to provide scheduling decisions across the data center. As such, it is possible that the centralized server may make scheduling decisions that overlook available features of the compute devices (e.g., that a compute device includes a field programmable gate array (FPGA) that is programmed to accelerate a particular type of function), and/or does not account for varying types of operations within a workload that may benefit (e.g., execute faster) from different types of acceleration, rather than a single type of acceleration.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
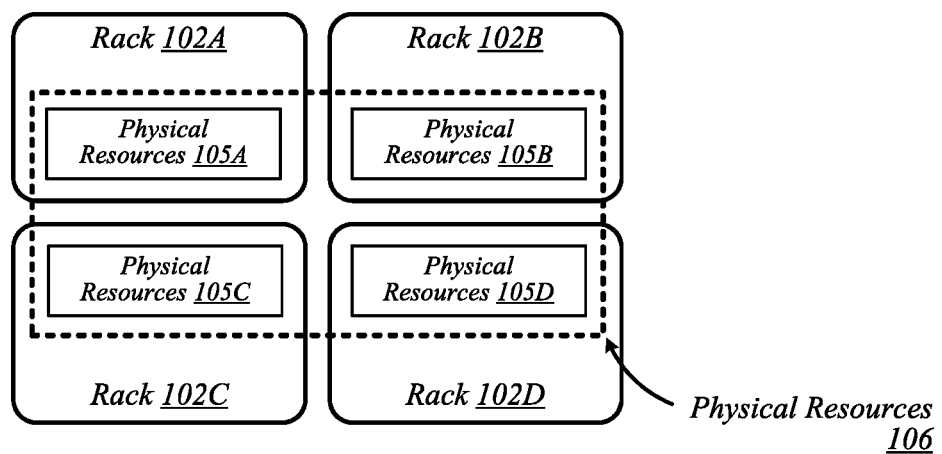
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
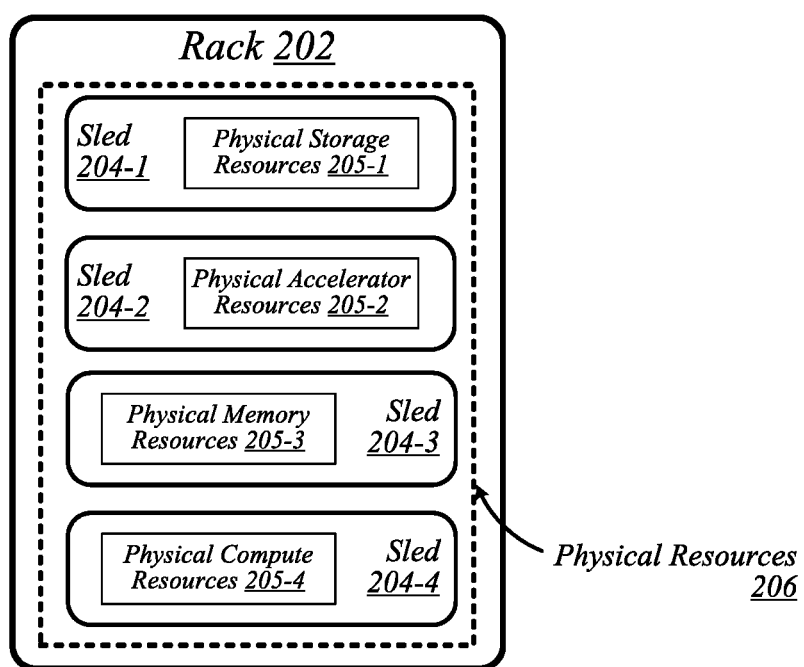
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
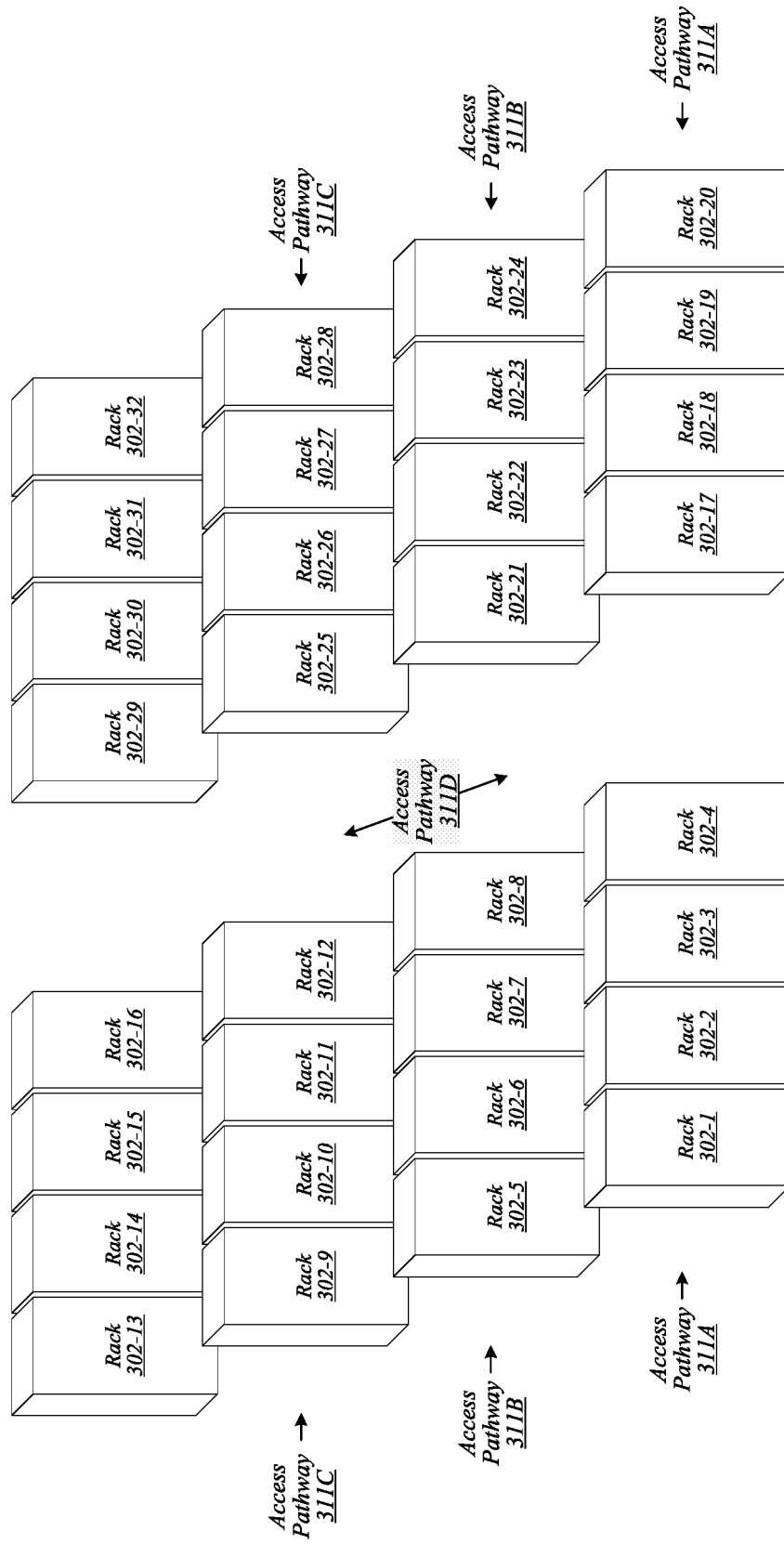
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
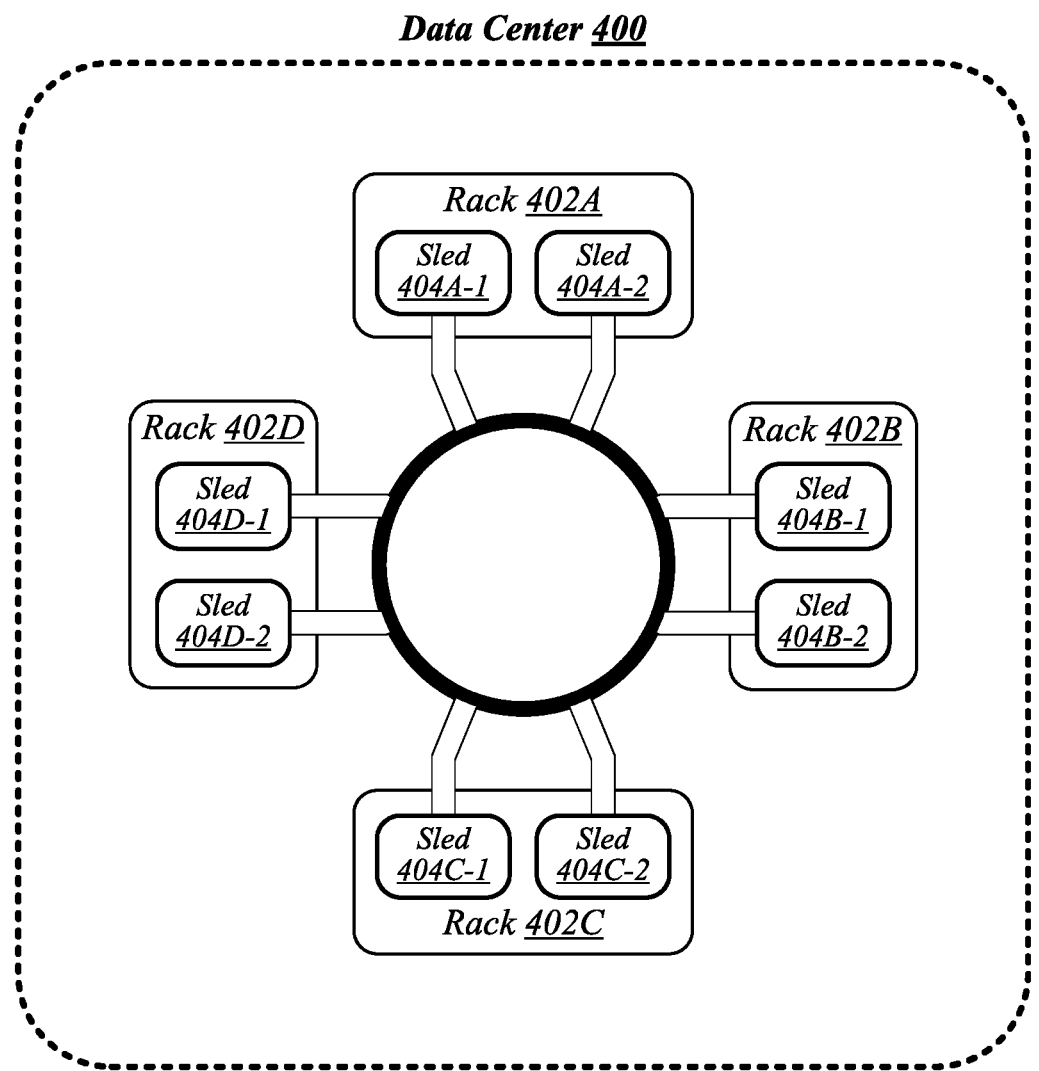
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
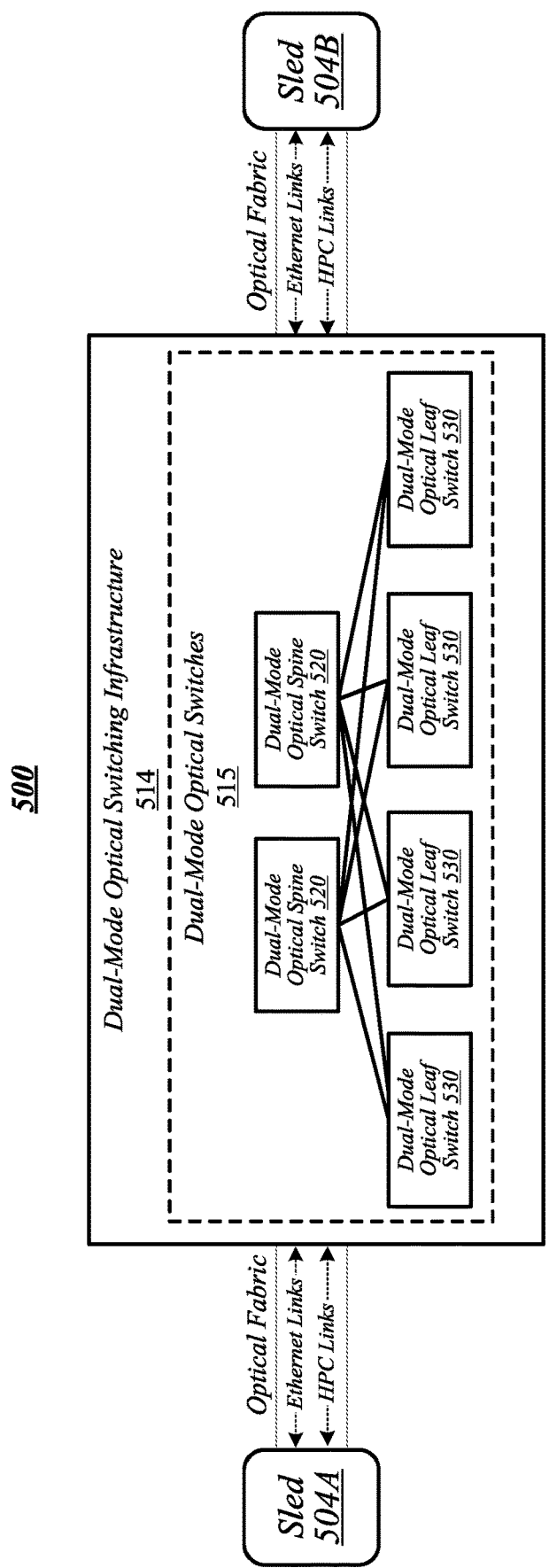
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
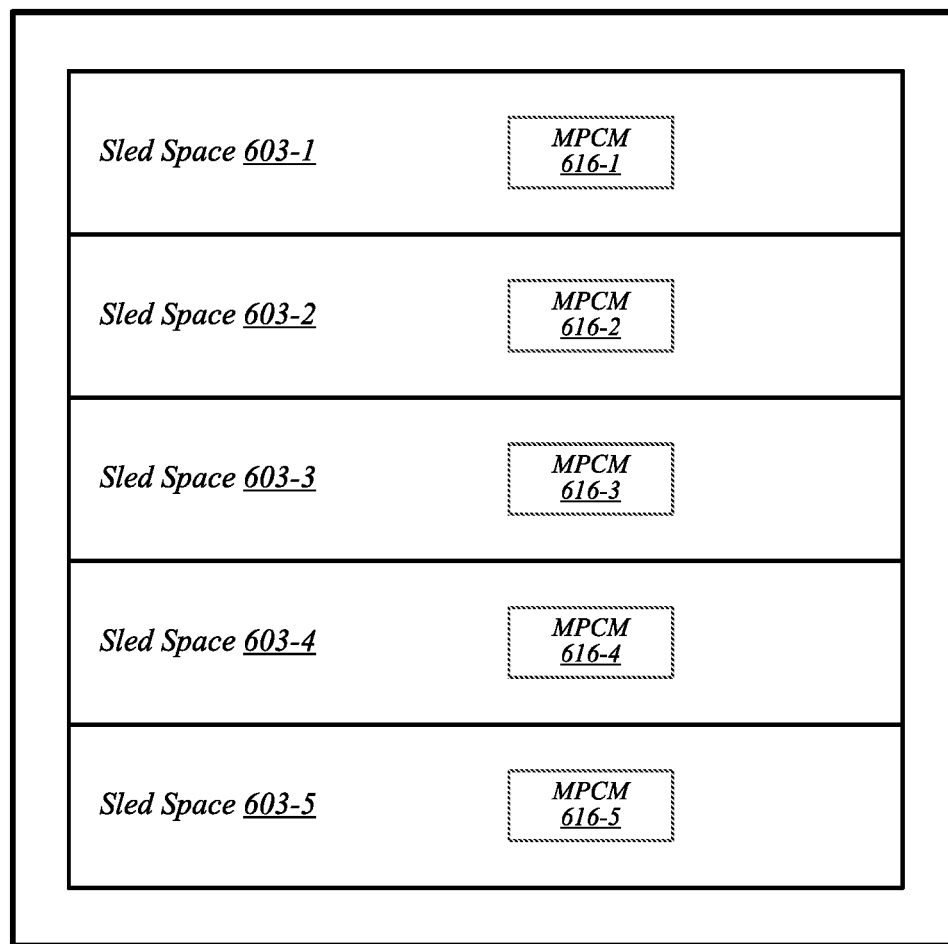
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
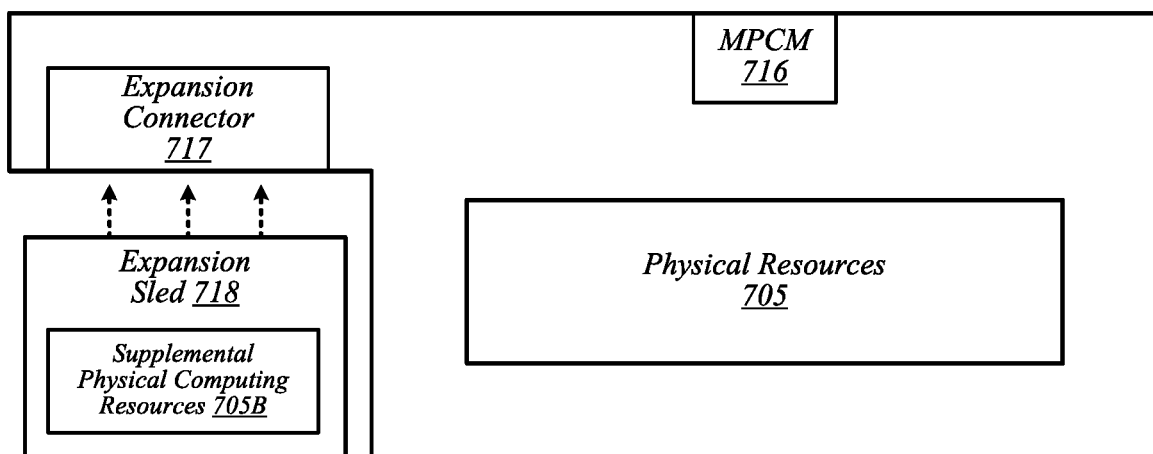
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
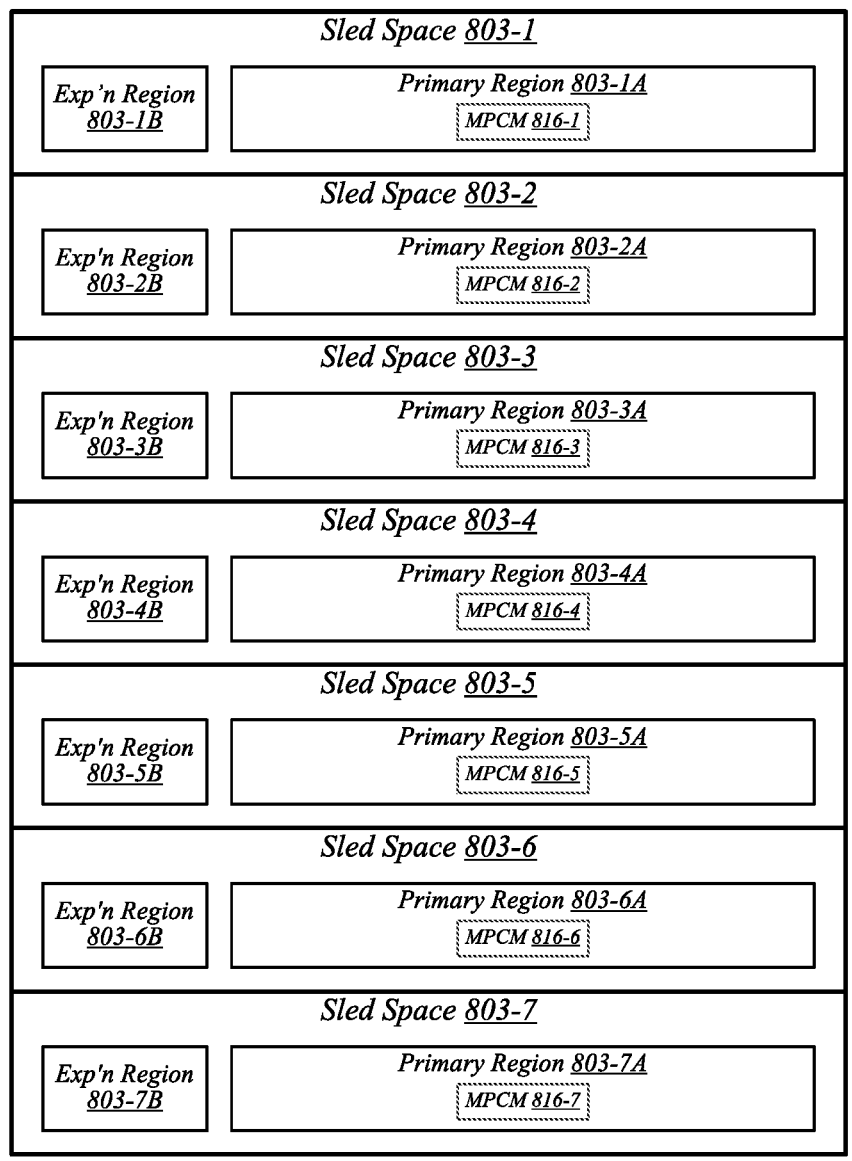
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
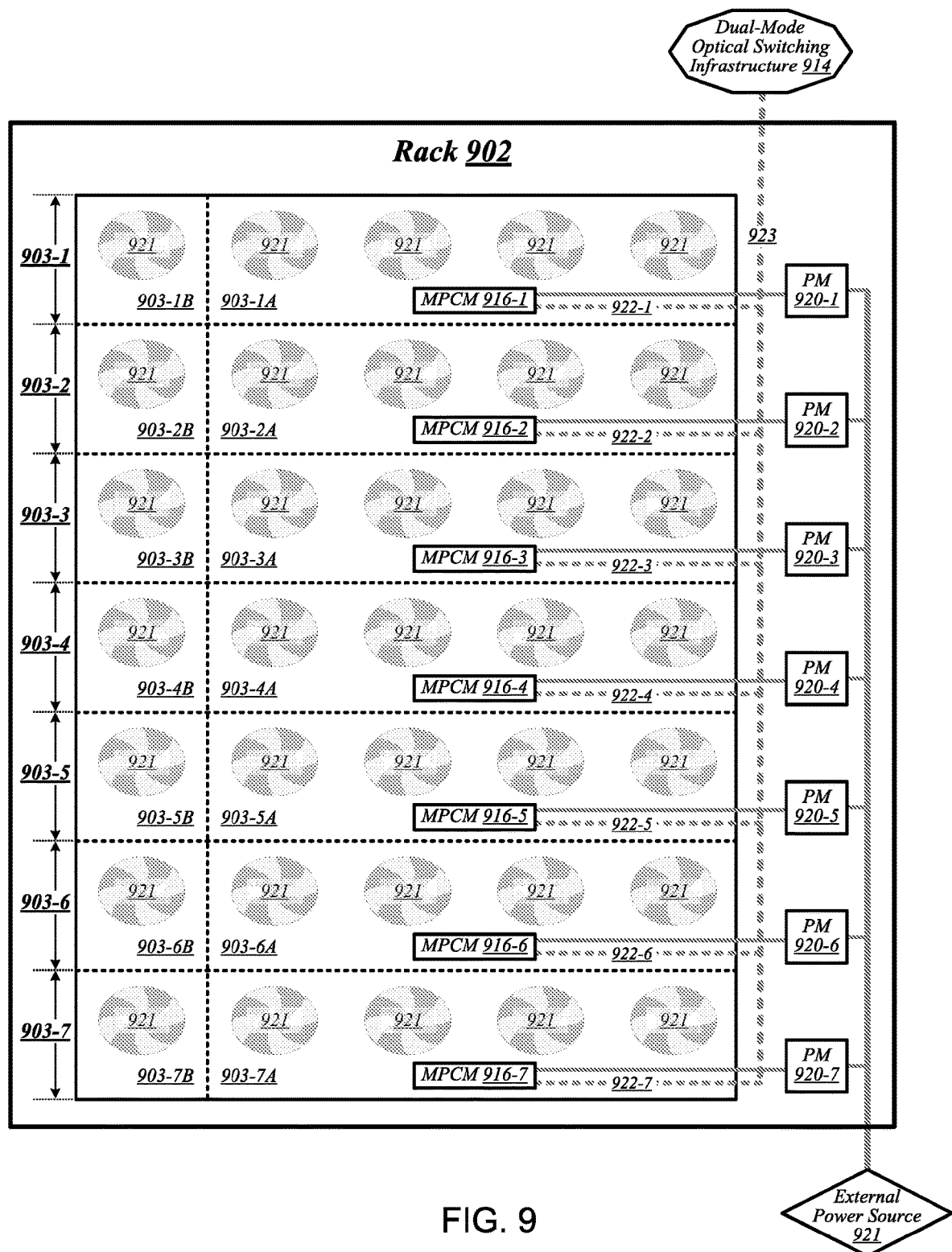
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
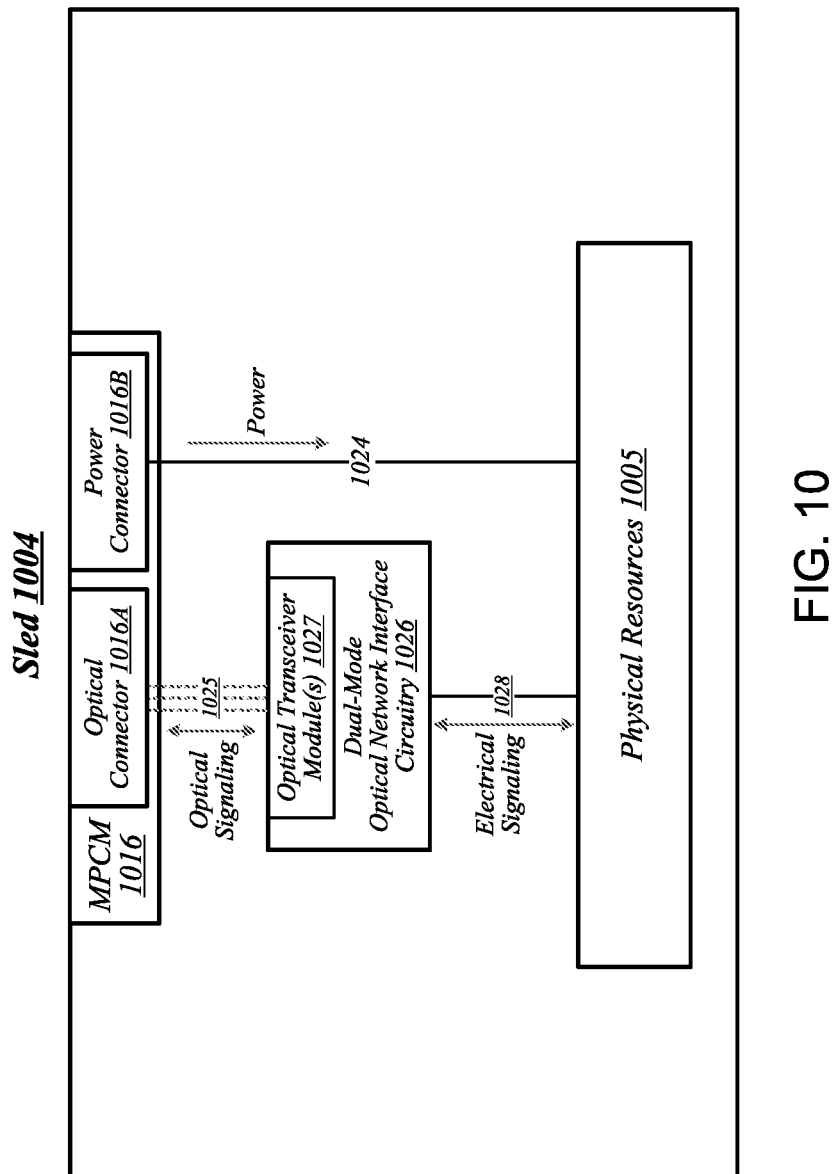
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
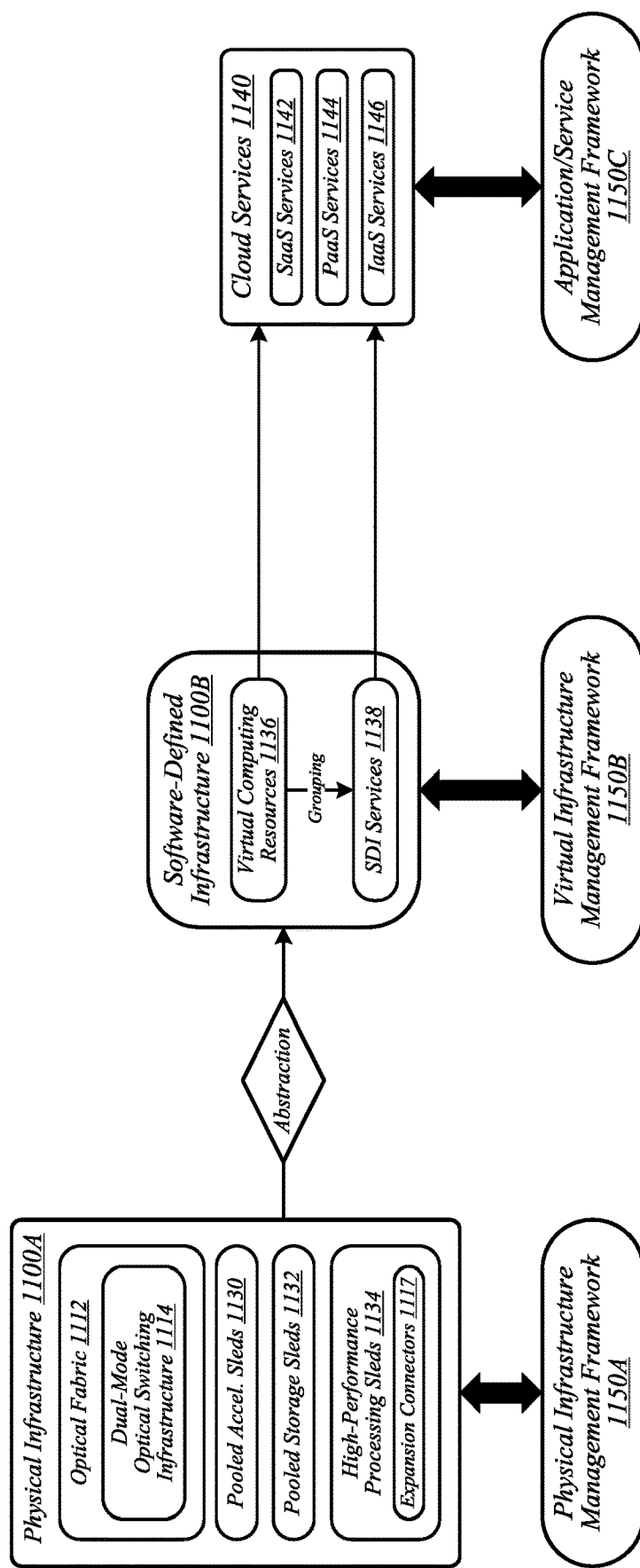
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
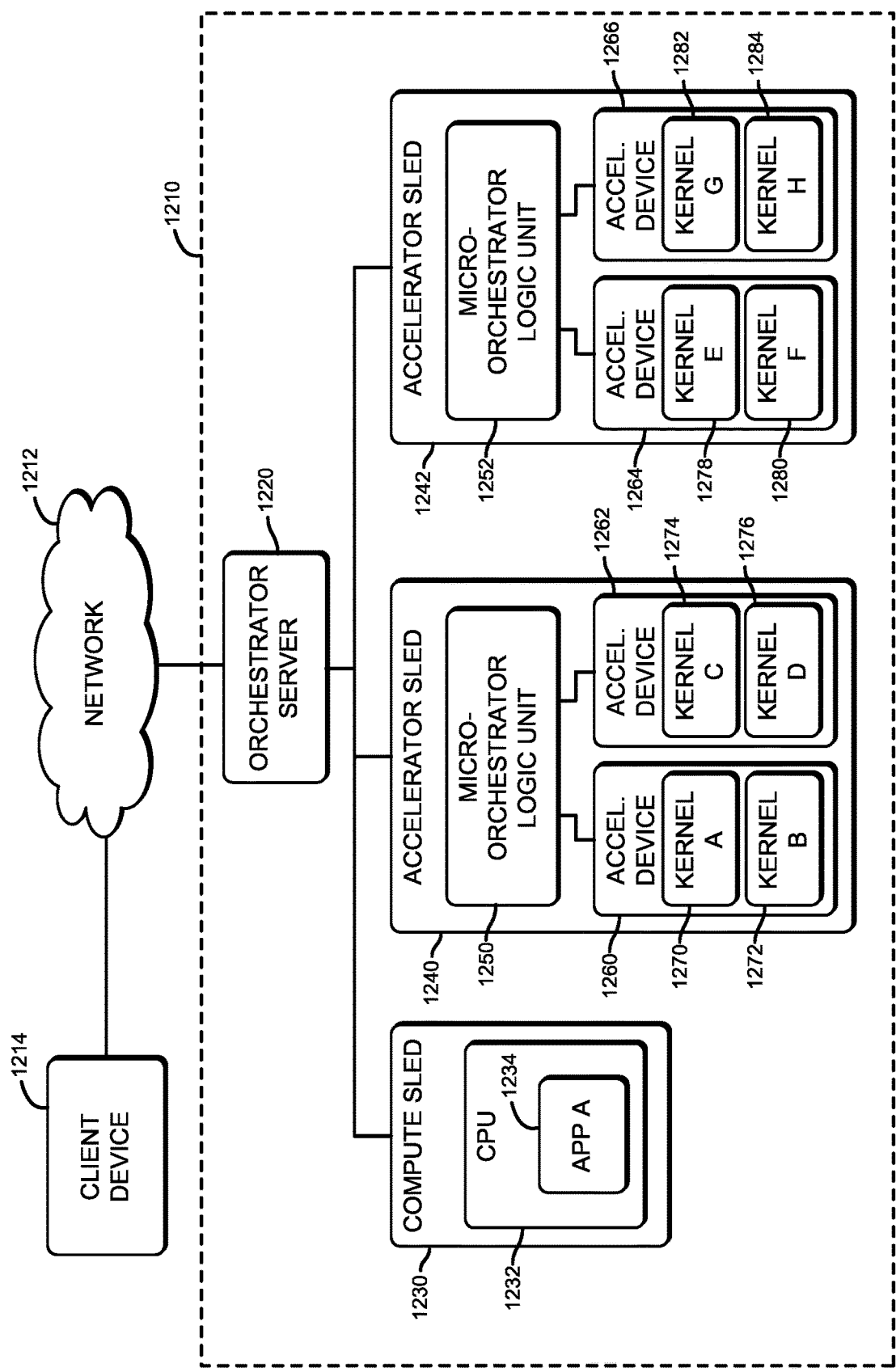
FIG. 12 is a simplified block diagram of at least one embodiment of a system for offloading acceleration task scheduling operations from an orchestrator server to accelerator sleds.

Referring now to FIG. 12, a system 1210 for offloading acceleration task scheduling operations from an orchestrator server to accelerator sleds may be implemented in accordance with the data centers 100, 300, 400, 1100 described above with reference to FIGS. 1, 3, 4, and 11. In the illustrative embodiment, the system 1210 includes an orchestrator server 1220 communicatively coupled to multiple sleds including a compute sled 1230 and accelerator sleds 1240, 1242. One or more of the sleds 1230, 1240, 1242 may be grouped into a managed node, such as by the orchestrator server 1220, to collectively perform a workload, such as an application. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and managed nodes established by the orchestrator server 1220 may execute one or more applications or processes (i.e., workloads), such as in virtual machines or containers, on behalf of a user of the client device 1214.

In the illustrative embodiment, the compute sled 1230 includes a central processing unit (CPU) 1232 (e.g., a processor or other device or circuitry capable of performing a series of operations) that executes a workload 1234 (e.g., an application). The accelerator sled 1240 includes a micro-orchestrator logic unit 1250, and multiple accelerator devices 1260, 1262, each of which includes multiple kernels 1270, 1272, 1274, 1276. The micro-orchestrator logic unit 1250 may be embodied as any device or circuitry (e.g., a processor, a field programmable gate array (FPGA), an application specific integrated circuit (ASIC), etc.) capable of determining the capabilities of the accelerator devices 1260, 1262 (e.g., identifying types of acceleration the accelerator devices are capable of performing, determining whether the accelerator devices are capable of accelerating tasks in parallel, such as by sharing data with a bus between the accelerator device and/or with shared virtual memory, determining the present computational load on each accelerator device), analyzing a request to accelerate one or more tasks (e.g., each a set of operations) within a job (e.g., all or a portion of the workload 1234), responding to the request with information on the availability of the accelerator devices 1260, 1262 to accelerate one or more of the tasks, and assigning one or more of the tasks to the accelerator devices 1260, 1262 for acceleration. The accelerator sled 1242 similarly includes a micro-orchestrator logic unit 1252 (also referred to herein as a "micro-orchestrator"), and a set of accelerator devices 1264, 1266 which include kernels 1278, 1280, 1282, 1284 (e.g., each a set of code or a configuration of a portion of the corresponding accelerator device that causes the accelerator device to perform one or more accelerated functions, such as cryptographic operations, compression operations, etc.). In operation, by performing the above determinations with the micro-orchestrator logic units 1250, 1252, the accelerator sleds 1240, 1242 offload, from the orchestrator server 1220, a significant portion of the data processing load associated with matching workloads or portions of workloads (e.g., tasks within jobs) to the accelerator devices 1260, 1262, 1264, 1266 in the data center and enable the scheduling of the tasks to be made with potentially more accurate and complete information than would be available to the orchestrator server 1220. As such, as compared to typical systems, the system 1210 may schedule tasks to the available accelerator devices 1260, 1262, 1264, 1266 more efficiently, resulting in fewer idle accelerator devices and faster execution of the tasks.

Figure 13:
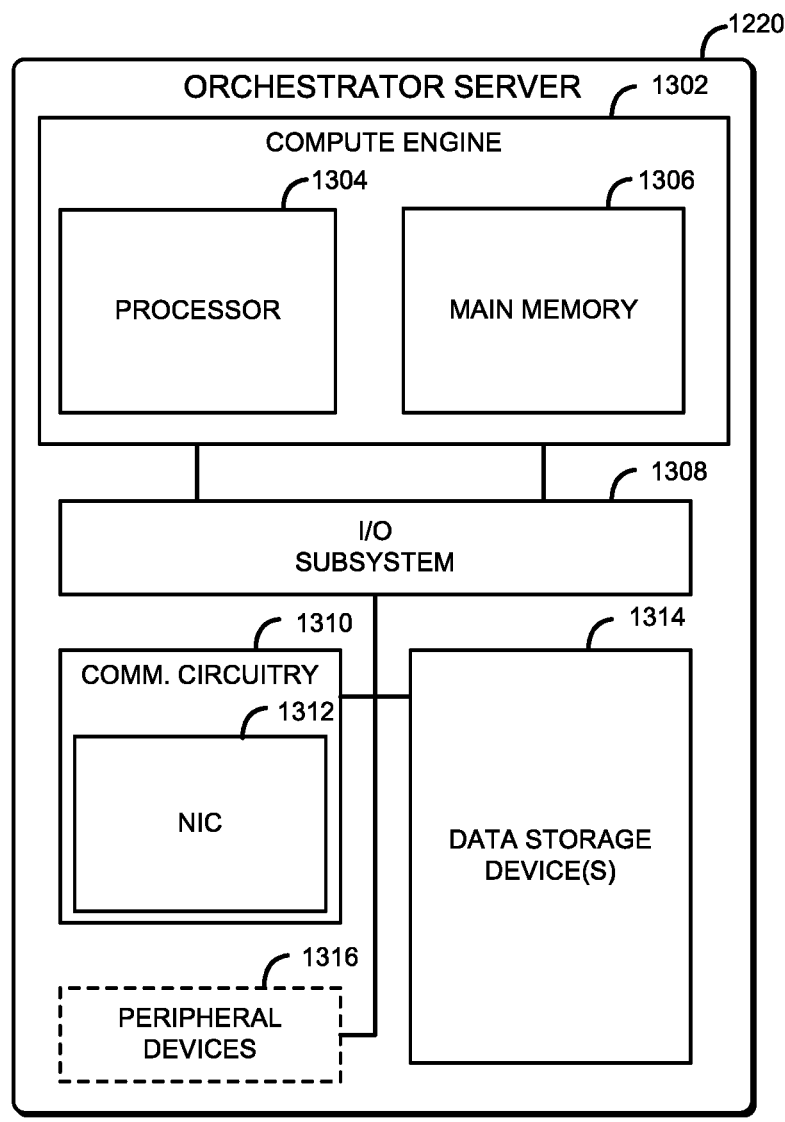
FIG. 13 is a simplified block diagram of at least one embodiment of the orchestrator server of the system of FIG. 12.

Referring now to FIG. 13, the orchestrator server 1220 may be embodied as any type of compute device capable of performing the functions described herein, including receiving a request from a compute sled to accelerate the execution of a job (e.g., a set of tasks), analyzing the request to generate metadata indicative of the tasks within the job, a type of acceleration associated with each task, and a data dependency between the tasks, sending an availability request, including the metadata, to one or more micro-orchestrators (e.g., the micro-orchestrator logic units 1250, 1252) of the corresponding accelerator sleds 1240, 1242, receiving availability data (e.g., data that is indicative of which of the tasks the micro-orchestrator has accepted for acceleration on the associated accelerator sled 1240, 1242) from the micro-orchestrators 1250, 1252, and assigning the tasks to the micro-orchestrators 1250, 1252 (e.g., to the corresponding accelerator sleds 1240, 1242) as a function of the availability data.

As shown in FIG. 13, the illustrative orchestrator server 1220 includes a compute engine 1302, an input/output (I/O) subsystem 1308, communication circuitry 1310, and one or more data storage devices 1314. Of course, in other embodiments, the orchestrator server 1220 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. Additionally, in some embodiments, the compute engine 1302 includes or is embodied as a processor 1304 and a memory 1306. The processor 1304 may be embodied as any type of processor capable of performing the functions described herein. For example, the processor 1304 may be embodied as a single or multi-core processor(s), a microcontroller, or other processor or processing/controlling circuit. In some embodiments, the processor 1304 may be embodied as, include, or be coupled to an FPGA, an application specific integrated circuit (ASIC), reconfigurable hardware or hardware circuitry, or other specialized hardware to facilitate performance of the functions described herein.

The main memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1306 may be integrated into the processor 1304. In operation, the main memory 1306 may store various software and data used during operation such as job request data, job metadata, micro-orchestrator response data, task assignment data, applications, programs, libraries, and drivers.

The compute engine 1302 is communicatively coupled to other components of the compute sled 1230 via the I/O subsystem 1308, which may be embodied as circuitry and/or components to facilitate input/output operations with the compute engine 1302 (e.g., with the processor 1304 and/or the main memory 1306) and other components of the orchestrator server 1220. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processor 1304, the main memory 1306, and other components of the orchestrator server 1220, into the compute engine 1302.

The communication circuitry 1310 may be embodied as any communication circuit, device, or collection thereof, capable of enabling communications over the network 1212 between the orchestrator server 1220 and another compute device (e.g., the compute sled 1230, the accelerator sleds 1240, 1242, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1310 includes a network interface controller (NIC) 1312, which may also be referred to as a host fabric interface (HFI). The NIC 1312 may be embodied as one or more add-in-boards, daughter cards, network interface cards, controller chips, chipsets, or other devices that may be used by the orchestrator server 1220 to connect with another compute device (e.g., the compute sled 1230, the accelerator sleds 1240, 1242 etc.). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein. Additionally or alternatively, in such embodiments, the local memory of the NIC 1312 may be integrated into one or more components of the orchestrator server 1220 at the board level, socket level, chip level, and/or other levels.

The one or more illustrative data storage devices 1314, may be embodied as any type of devices configured for short-term or long-term storage of data such as, for example, memory devices and circuits, memory cards, hard disk drives, solid-state drives, or other data storage devices. Each data storage device 1314 may include a system partition that stores data and firmware code for the data storage device 1314. Each data storage device 1314 may also include an operating system partition that stores data files and executables for an operating system.

Additionally or alternatively, the orchestrator server 1220 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

Figure 14:
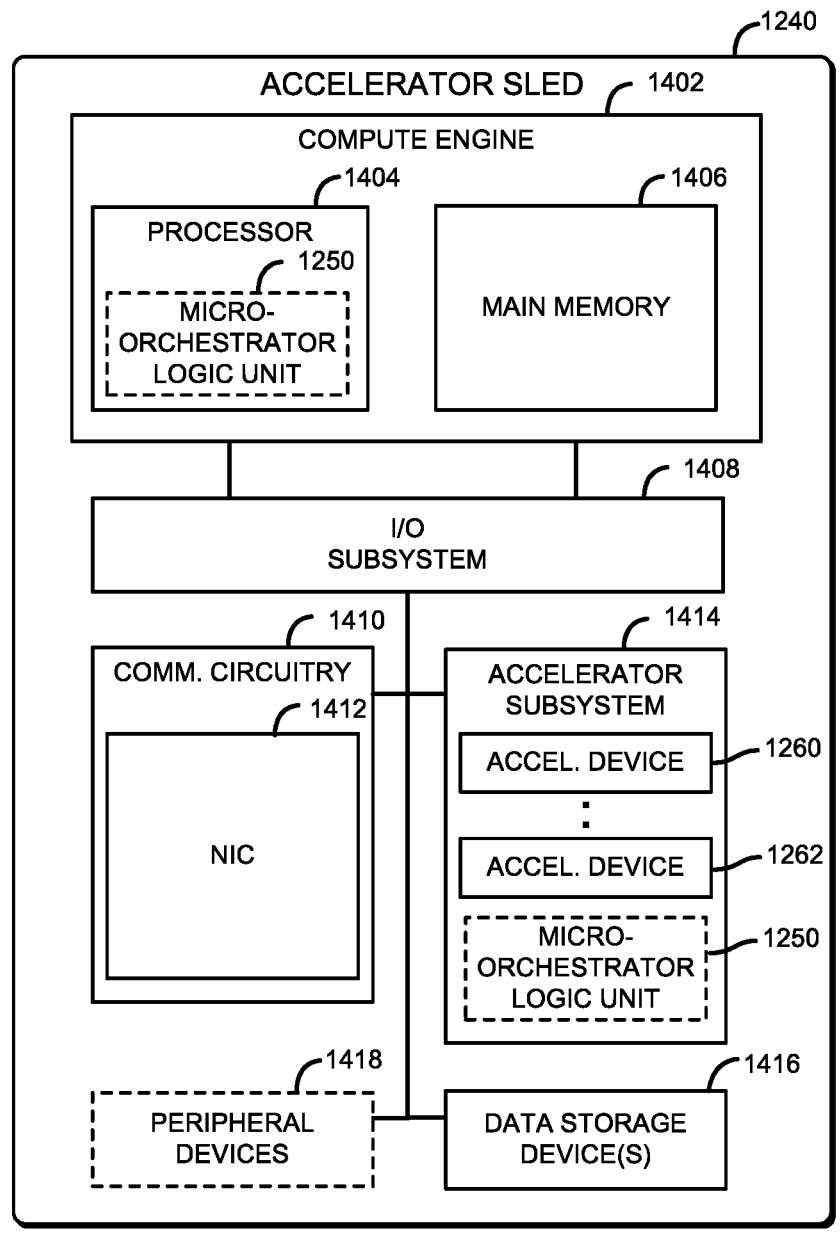
FIG. 14 is a simplified block diagram of at least one embodiment of an accelerator sled of the system of FIG. 13.

Referring now to FIG. 14, the accelerator sled 1240 may be embodied as any type of compute device capable of performing the functions described herein, including determining acceleration capabilities of the accelerator devices on the accelerator sled 1240, receiving the availability request from a compute device (e.g., from the orchestrator server 1220), determining the availability of the accelerator devices to accelerate the tasks as a function of the determined acceleration capabilities and the metadata in the availability request, obtaining an assignment of the accelerator devices to the tasks as a function of the determined availability, and executing the assigned tasks.

As shown in FIG. 14, the illustrative accelerator sled 1240 includes a compute engine 1402, an input/output (I/O) subsystem 1408, communication circuitry 1410, an accelerator subsystem 1414, and one or more data storage devices 1416. Of course, in other embodiments, the accelerator sled 1240 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1402 may be embodied as any type of device or collection of devices capable of performing various compute functions described below. In some embodiments, the compute engine 1402 may be embodied as a single device such as an integrated circuit, an embedded system, a field-programmable gate array (FPGA), a system-on-a-chip (SOC), or other integrated system or device. Additionally, in some embodiments, the compute engine 1402 includes or is embodied as a processor 1404 and a memory 1406. The processor 1404 may be embodied as any type of processor capable of performing the functions described herein. For example, the processor 1404 may be embodied as a single or multi-core processor(s), a microcontroller, or other processor or processing/controlling circuit. In some embodiments, the processor 1404 may be embodied as, include, or be coupled to an FPGA, an application specific integrated circuit (ASIC), reconfigurable hardware or hardware circuitry, or other specialized hardware to facilitate performance of the functions described herein. The processor 1404 may include the micro-orchestrator logic unit 1250, described above with reference to FIG. 12.

The main memory 1406 may be embodied as any type of volatile (e.g., dynamic random access memory (DRAM), etc.) or non-volatile memory or data storage capable of performing the functions described herein. In operation, the main memory 1406 may store various software and data used during operation such as acceleration capability data, job metadata data, task data, applications, programs, libraries, and drivers.

The compute engine 1402 is communicatively coupled to other components of the data storage sled 1240 via the I/O subsystem 1408, which may be embodied as circuitry and/or components to facilitate input/output operations with the compute engine 1402 (e.g., with the processor 1404 and/or the main memory 1406) and other components of the accelerator sled 1240. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1408 may form a portion of a system-on-a-chip (SoC) and be incorporated, along with one or more of the processor 1404, the main memory 1406, and other components of the accelerator sled 1240, into the compute engine 1402.

The communication circuitry 1410 may be embodied as any communication circuit, device, or collection thereof, capable of enabling communications over the network 1212 between the accelerator sled 1240 and another compute device (e.g., the orchestrator server 1220, the compute sled 1230, the accelerator sled 1242, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1410 includes a network interface controller (NIC) 1412, which may also be referred to as a host fabric interface (HFI). The NIC 1412 may be embodied as one or more add-in-boards, daughter cards, network interface cards, controller chips, chipsets, or other devices that may be used by the accelerator sled 1240 to connect with another compute device (e.g., the orchestrator server 1220, the compute sled 1230, the accelerator sled 1242, etc.). In some embodiments, the NIC 1412 may be embodied as part of a system-on-a-chip (SoC) that includes one or more processors, or included on a multichip package that also contains one or more processors. In some embodiments, the NIC 1412 may include a local processor (not shown) and/or a local memory (not shown) that are both local to the NIC 1412. In such embodiments, the local processor of the NIC 1412 may be capable of performing one or more of the functions of the compute engine 1402 described herein. Additionally or alternatively, in such embodiments, the local memory of the NIC 1412 may be integrated into one or more components of the accelerator sled 1240 at the board level, socket level, chip level, and/or other levels.

The accelerator subsystem 1414 may be embodied as a set of accelerator devices, such as the accelerator devices 1260, 1262. In some embodiments, the accelerator subsystem 1414 may also include one or more buses or other interfaces between the accelerator devices 1260, 1262 to enable the accelerator devices 1260, 1262 to share data. Each accelerator device 1260, 1262 may be embodied as any device or circuitry (e.g., a specialized processor, an FPGA, an ASIC, a graphics processing unit (GPU), reconfigurable hardware, etc.) capable of accelerating the execution of a function. In some embodiments, all or a portion of the micro-orchestrator logic unit 1250 may be incorporated in the accelerator subsystem 1414.

The one or more illustrative data storage devices 1416, may be embodied as any type of devices configured for short-term or long-term storage of data such as, for example, memory devices and circuits, memory cards, hard disk drives, solid-state drives, or other data storage devices. Each data storage device 1416 may include a system partition that stores data and firmware code for the data storage device 1416. Each data storage device 1416 may also include an operating system partition that stores data files and executables for an operating system.

Additionally or alternatively, the accelerator sled 1240 may include one or more peripheral devices 1418. Such peripheral devices 1418 may include any type of peripheral device commonly found in a compute device such as a display, speakers, a mouse, a keyboard, and/or other input/output devices, interface devices, and/or other peripheral devices.

The client device 1214 and the compute sled 1230 may have components similar to those described in FIG. 13 and the accelerator sled 1242 may have components similar to those described in FIG. 14. The description of those components of the orchestrator server 1220 and the accelerator sled 1240 is equally applicable to the description of components of those devices and is not repeated herein for clarity of the description. Further, it should be appreciated that any of the client device 1214, the orchestrator server 1220, and the sleds 1230, 1240, 1242 may include other components, sub-components, and devices commonly found in a computing device, which are not discussed above in reference to the orchestrator server 1220 and the accelerator sled 1240 and not discussed herein for clarity of the description.

As described above, the client device 1214, the orchestrator server 1220, and the sleds 1230, 1240, 1242 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 15:
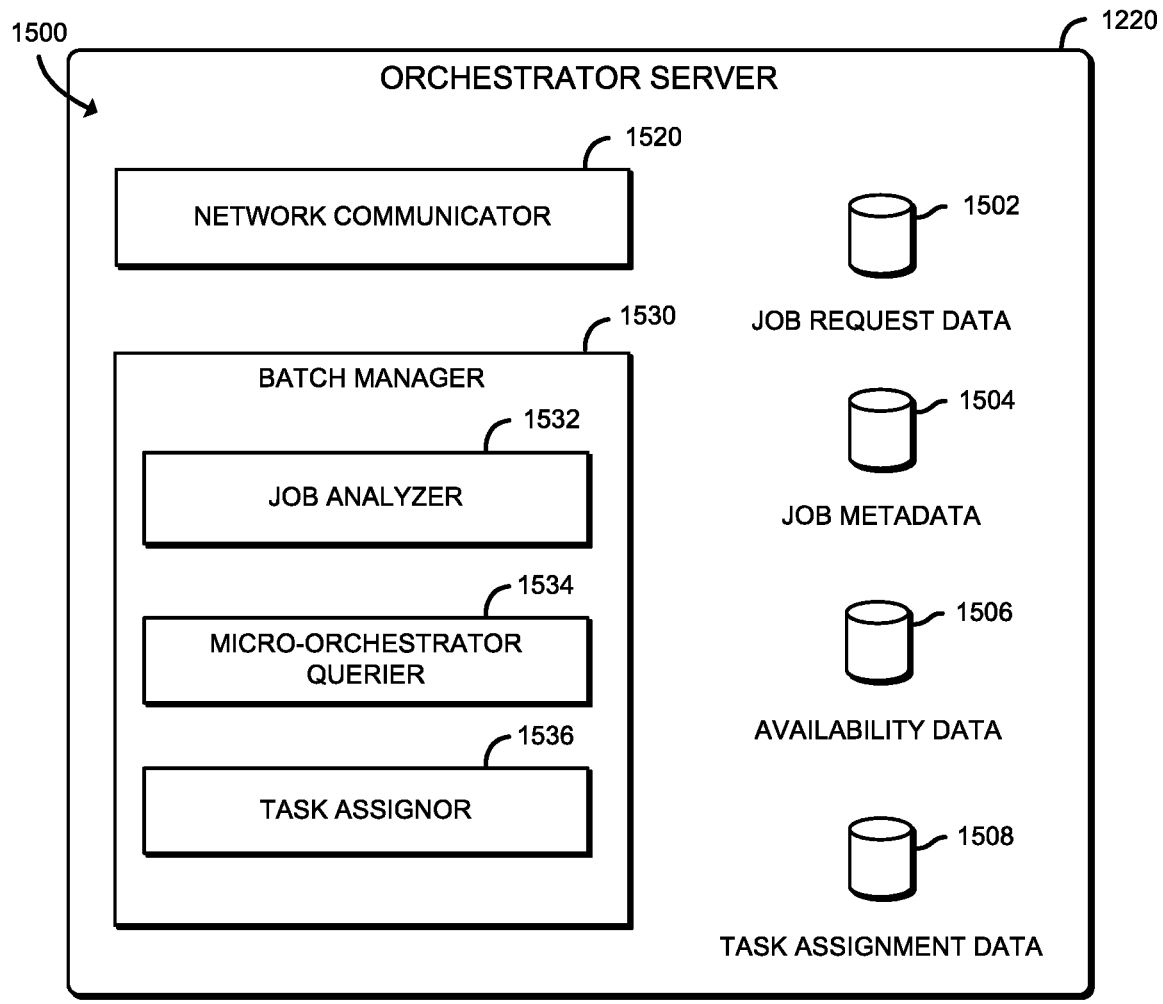
FIG. 15 is a simplified block diagram of at least one embodiment of an environment that may be established by the orchestrator server of FIGS. 12 and 13.

Referring now to FIG. 15, the orchestrator server 1220 may establish an environment 1500 during operation. The illustrative environment 1500 includes a network communicator 1520 and a batch manager 1530. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, batch manager circuitry 1530, etc.). It should be appreciated that, in such embodiments, one or more of the network communicator circuitry 1520 or batch manager circuitry 1530 may form a portion of one or more of the compute engine 1302, the communication circuitry 1310, the I/O subsystem 1308, and/or other components of the orchestrator server 1220. In the illustrative embodiment, the environment 1500 includes job request data 1502, which may be embodied as any data indicative of one or more requests received by the orchestrator server 1220 from a compute sled (e.g., the compute sled 1230) to accelerate a set of tasks associated with all or a portion of a workload (e.g., a job). Additionally, in the illustrative embodiment, the environment 1500 includes job metadata 1504, which may be any data generated by the orchestrator server 1220 that identifies characteristics of each job corresponding to one of the job requests. In the illustrative embodiment, the job metadata 1504 indicates, for each job, a set of tasks to be accelerated, a type of acceleration associated with each of the tasks (e.g., one task may be an encryption acceleration task, another task may be a data compression acceleration task, etc.), and a data dependence between the tasks (e.g., whether one task relies on the output of an earlier task as input, multiple tasks may operate on independent data sets or on different portions of the same data set, etc.). Additionally, the illustrative environment 1500 includes availability data 1506, which may be embodied as any data indicative of which of the tasks each micro-orchestrator 1250, 1252 has accepted for acceleration on the associated accelerator sled 1240, 1242 (e.g., in response to an availability request from the orchestrator server 1220, as described in more detail herein). Further, in the illustrative embodiment, the environment 1500 includes task assignment data 1508 which may be indicative of assignments of tasks to the micro-orchestrators 1250, 1252 (e.g., made by the orchestrator server 1220 in response to receipt of the availability data 1506, as described in more detail herein).

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1220, respectively. To do so, the network communicator 1520 is configured to receive and process data packets from one system or computing device (e.g., the compute sled 1230) and to prepare and send data packets to another computing device or system (e.g., the accelerator sleds 1240, 1242). Accordingly, in some embodiments, at least a portion of the functionality of the network communicator 1520 may be performed by the communication circuitry 1310, and, in the illustrative embodiment, by the NIC 1312.

The batch manager 1530, which may be embodied as hardware, firmware, software, virtualized hardware, emulated architecture, and/or a combination thereof, is configured to assign tasks to micro-orchestrators (e.g., the micro-orchestrators 1250, 1252) to execute batches of tasks (e.g., series of tasks associated with jobs) that take advantage of the available acceleration features of the accelerator devices on each accelerator sled, and in view of the data dependence of the tasks and the loads on the accelerator devices within the accelerator sleds 1240, 1242. In doing so, much of the discovery of the features of the accelerator devices, their present loads, and scheduling of the tasks is offloaded to the micro-orchestrators 1250, 1252, rather than being performed by the orchestrator server 1220, because the batch manager provides information (e.g., the metadata in the availability request) usable by the micro-orchestrators to determine whether the accelerator devices on their corresponding accelerator sleds 1240, 1242 are capable of taking on the tasks represented in an availability request. In the illustrative embodiment, the batch manager 1530 includes a job analyzer 1532, a micro-orchestrator querier 1534, and a task assignor 1536. The job analyzer 1532, in the illustrative embodiment, is configured to identify tasks within a job, in response to receipt of a job request from a compute sled (e.g., the compute sled 1230). In doing so, the job analyzer 1532 may analyze a description of the job to identify the tasks making up the job. The description may be a set of attributes and/or a set of code (e.g., a script, such as an OpenCL script, a bit-stream, etc.). In analyzing a set of code, the job analyzer 1532 may identify operations represented in the code and group them into tasks (e.g., a task associated with a set of related operations that could benefit from the same type of acceleration, such as a set of cryptographic operations that may utilize a cryptographic accelerator, and another task associated with a set of operations that could execute faster with a compression accelerator, etc.). In the illustrative embodiment, the job analyzer 1532 also generates the metadata 1504 as an output of the analysis.

The micro-orchestrator querier 1534, in the illustrative embodiment, is configured to send availability requests including the job metadata 1504 to the micro-orchestrators 1250, 1252 to determine their availability to accelerate one or more of the tasks. In response, the micro-orchestrator querier 1534 receives the availability data 1506 described above. The task assignor 1536, in the illustrative embodiment, is configured to assign the tasks to the micro-orchestrators 1250, 1252 in response to the availability data 1506 reported back by the micro-orchestrators 1250, 1252. In doing so, the task assignor may follow a predefined policy, such as assigning the tasks as a function of the best fit of an accelerator sled 1240, 1242 to a task (e.g., to assign tasks to a micro-orchestrator that can take on the largest number of tasks associated with a job, to assign tasks to the micro-orchestrator that indicated, in the availability data, a shorter estimated amount of time to complete the tasks than any other micro-orchestrator, etc.), and/or another policy (e.g., assigning tasks to the first micro-orchestrator to respond, etc.).

It should be appreciated that each of the job analyzer 1532, the micro-orchestrator querier 1534, and the task assignor 1536 may be separately embodied as hardware, firmware, software, virtualized hardware, emulated architecture, and/or a combination thereof. For example, the job analyzer 1532 may be embodied as a hardware component, while the micro-orchestrator querier 1534 and the task assignor 1536 are embodied as virtualized hardware components or as some other combination of hardware, firmware, software, virtualized hardware, emulated architecture, and/or a combination thereof.

Figure 16:
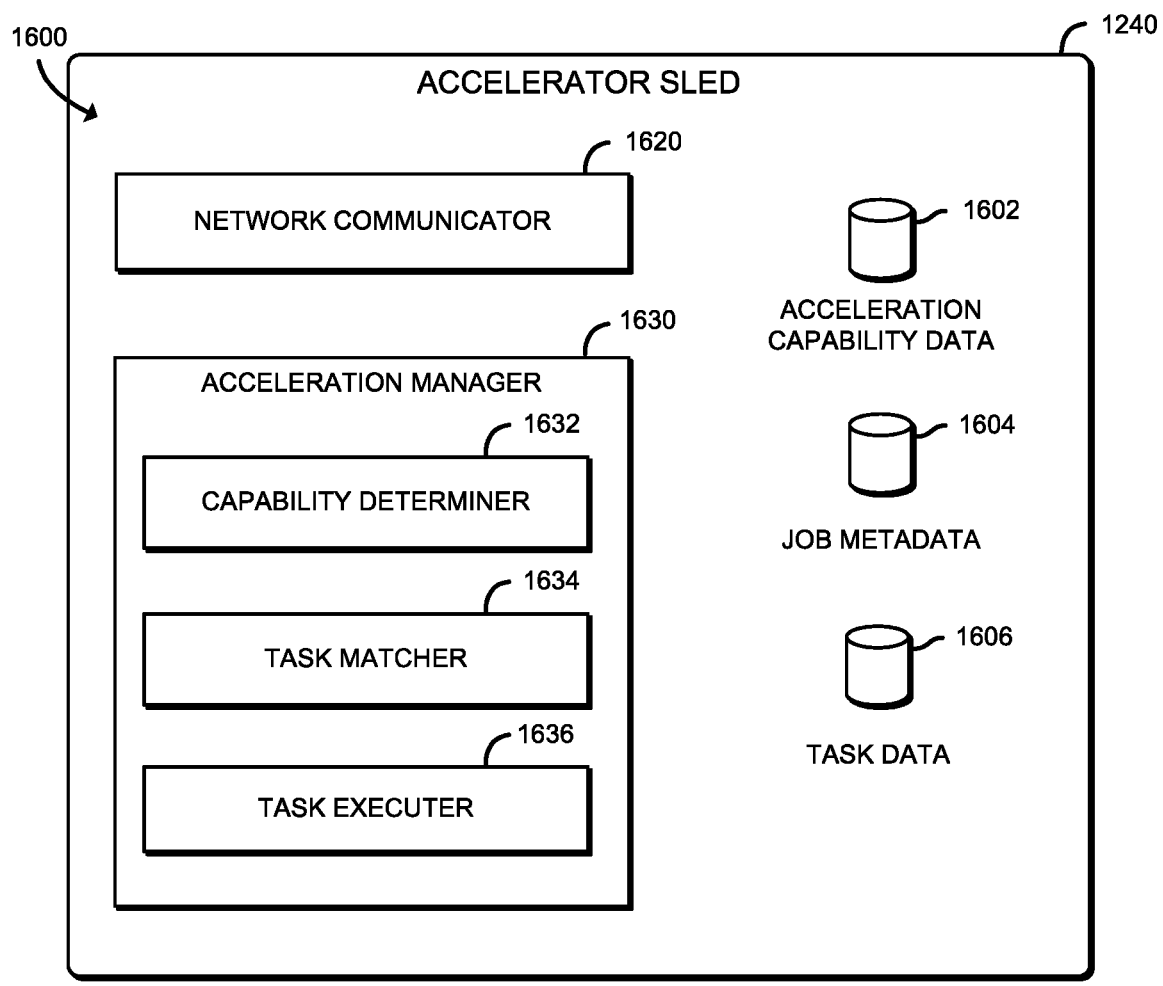
FIG. 16 is a simplified block diagram of at least one embodiment of an environment that may be established by the accelerator sled of FIGS. 12 and 14.

Referring now to FIG. 16, the accelerator sled 1240 may establish an environment 1600 during operation. The illustrative environment 1600 includes a network communicator 1620 and an acceleration manager 1630. Each of the components of the environment 1600 may be embodied as hardware, firmware, software, or a combination thereof. As such, in some embodiments, one or more of the components of the environment 1600 may be embodied as circuitry or a collection of electrical devices (e.g., network communicator circuitry 1620, acceleration manager circuitry 1630, etc.). It should be appreciated that, in such embodiments, one or more of the network communicator circuitry 1620 or acceleration manager circuitry 1630 may form a portion of one or more of the compute engine 1402, the micro-orchestrator logic unit 1250, the accelerator subsystem 1414, the communication circuitry 1410, the I/O subsystem 1408, and/or other components of the accelerator sled 1240. The illustrative environment 1600 includes acceleration capability data 1602, which may be embodied as any data indicative of types of acceleration the accelerator devices are capable of performing, whether the accelerator devices are capable of accelerating tasks in parallel, such as by sharing data with a bus between the accelerator devices and/or with shared virtual memory, and the present computational load on each accelerator device. Additionally, the illustrative environment 1600 includes job metadata 1604, which is similar to the job metadata 1504 described above with reference to FIG. 15. The illustrative environment 1600 also includes task data 1606, which may be embodied as any data indicative of tasks assigned to the present accelerator sled, their status (e.g., percent complete, estimated time to completion, accelerator device to which each task is assigned, data utilized by each task as input, and output data produced by each task).

In the illustrative environment 1600, the network communicator 1620, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the accelerator sled 1240, respectively. To do so, the network communicator 1620 is configured to receive and process data packets from one system or computing device (e.g., the orchestrator server 1220) and to prepare and send data packets to another computing device or system (e.g., the compute sled 1230). Accordingly, in some embodiments, at least a portion of the functionality of the network communicator 1620 may be performed by the communication circuitry 1410, and, in the illustrative embodiment, by the NIC 1412.

The acceleration manager 1630, which may be embodied as hardware, firmware, software, virtualized hardware, emulated architecture, and/or a combination thereof, is configured to determine the acceleration capabilities of the accelerator devices of the compute sled 1240, receive an availability request indicative of a set of tasks to be accelerated, determine an availability of the accelerator devices to accelerate the tasks, send the availability information (e.g., the availability data 1506) to the orchestrator server 1220, receive an assignment of one or more of the tasks, and provide the tasks to the accelerator devices for execution. To do so, in the illustrative embodiment, the acceleration manager 1630 includes a capability determiner 1632, a task matcher 1634, and a task executor 1636.

The capability determiner 1632, in the illustrative embodiment, is configured to determine types of acceleration the accelerator devices 1260, 1262 of the accelerator sled 1240 are capable of performing, such as by identifying one or more kernels (e.g., the kernels 1270, 1272, 1274, 1276) in each accelerator device 1260, 1262, by reading data from a register that is indicative of a model or serial number of each accelerator device 1260, 1262 and/or a set of features supported by each accelerator device 1260, 1262, and/or by other methods. In doing so, the capability determiner 1632 may determine whether a given accelerator device 1260, 1262 is capable of sharing data with another accelerator device (e.g., through a bus and/or a shared virtual memory). Additionally, the capability determiner 1632 is configured to determine a present load on each accelerator device 1260, 1262 such as by querying each accelerator device to receive information indicative of the load (e.g., a percentage of total acceleration capacity being utilized), by analyzing telemetry data indicative of operations per second, a temperature, and/or other conditions and comparing the conditions to threshold conditions indicative of a maximum load, and/or by other methods. In the illustrative embodiment, in making the determinations described above, the capability determiner 1632 produces the acceleration capability data 1602 described above.

The task matcher 1634, in the illustrative embodiment, is configured to determine, as a function of the acceleration capability data 1602 generated by the capability determiner 1632 and the job metadata 1604, which tasks associated with a job would be suited for a corresponding accelerator device on the present accelerator sled 1260, and report the determinations to the orchestrator server 1220 as the availability data 1506, as described in more detail herein. The task executor 1636 is configured provide tasks (e.g., data sets, parameters, etc.) assigned by the orchestrator server 1220 to the corresponding accelerator devices on the accelerator sled 1240 according to a schedule that takes into account the data dependency between the tasks. For example, the task executor 1636 may schedule task D, which relies on an output of task A, to occur after the execution of task A. As another example, the task executor 1636 may schedule tasks that do not rely on the same data set to be performed in parallel. As yet another example, the task executor 1636 may schedule tasks that share a data set to be performed in parallel by accelerator devices capable of sharing data, such as through a shared virtual memory or a bus between the accelerator devices.

It should be appreciated that each of the capability determiner 1632, the task matcher 1634, and the task executor 1636 may be separately embodied as hardware, firmware, software, virtualized hardware, emulated architecture, and/or a combination thereof. For example, the capability determiner 1632 may be embodied as a hardware component, while the task matcher 1634 and the task executor 1636 are embodied as virtualized hardware components or as some other combination of hardware, firmware, software, virtualized hardware, emulated architecture, and/or a combination thereof. Further, it should be appreciated that, in the illustrative embodiment, the accelerator sled 1242 establishes an environment similar to the environment 1600.

Figure 17:
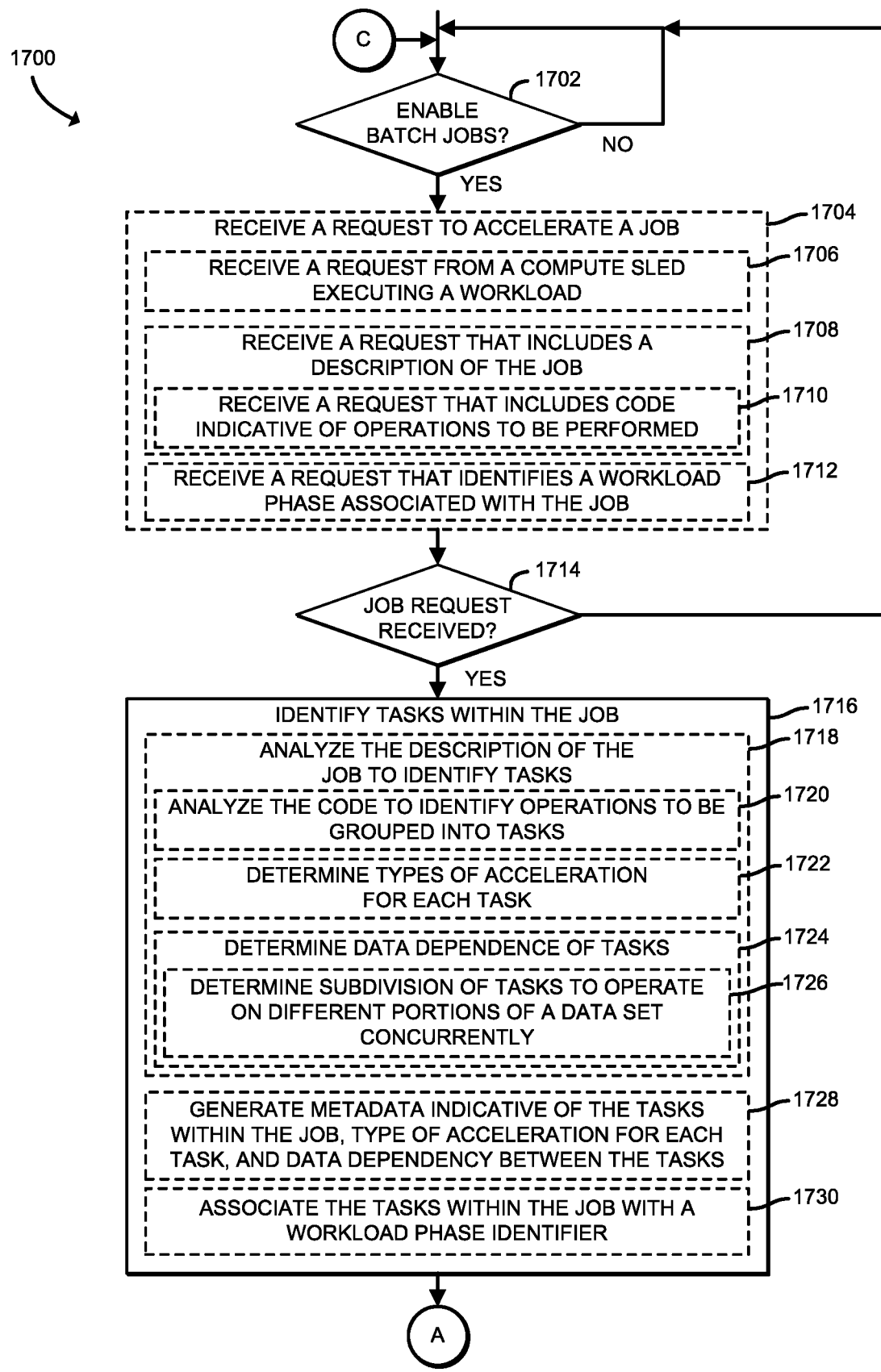
FIGS. 17-19 are a simplified flow diagram of at least one embodiment of a method for enabling the scheduling of batches of tasks associated with a workload that may be performed by the orchestrator server of FIGS. 12 and 13.

Referring now to FIG. 17, the orchestrator server 1220, in operation, may execute a method 1700 to enable the scheduling of batches of tasks to be performed by the accelerator sleds 1240, 1242. The method 1700 begins with block 1702 in which the orchestrator server 1220 determines whether to enable scheduling of batches of tasks. In the illustrative embodiment, the orchestrator server 1220 may determine to enable scheduling of batches of tasks if the orchestrator server 1220 is communicatively coupled to one or more accelerator sleds equipped with micro-orchestrators (e.g., the accelerator sleds 1240, 1242 and the micro-orchestrator logic units 1250, 1252), and/or based on other factors. In response to a determination to enable scheduling of batches of tasks, the method 1700 advances to block 1704 in which the orchestrator server 1220 may receive a request to accelerate a job. In doing so, the orchestrator server 1220, in the illustrative embodiment, receives the request from a compute sled (e.g., the compute sled 1230) executing a workload (e.g., the workload 1234), as indicated in block 1706. Further, in the illustrative embodiment, the orchestrator server 1220 receives a request that includes a description of the job, as indicated in block 1708. In doing so, the orchestrator server 1220 may receive a request that includes code (e.g., OpenCL code) indicative of operations to be performed, as indicated in block 1710. Additionally or alternatively, the orchestrator server 1220 may receive a request that identifies a workload phase (e.g., a period of execution in which a particular set of operations are performed that utilize different amounts and/or types of resources than other phases) associated with the job (e.g., a phase identifier, such as a label, to be associated with the set of tasks in the job), as indicated in block 1712.

Figure 23:
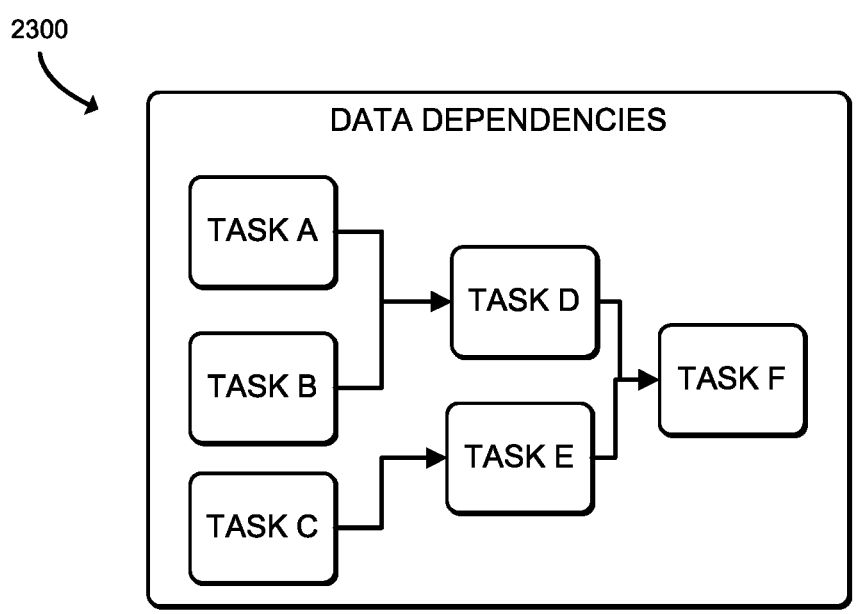
FIG. 23 is a simplified diagram of tasks associated with a job and data dependencies between the tasks.

Subsequently, in block 1714, the orchestrator server 1220 determines the next actions to take based on whether a job request was received. If not, the method 1700 loops back to block 1702 in which the orchestrator server 1220 determines whether to continue to enable scheduling of batches of tasks and await a request to accelerate a job. Otherwise, if the orchestrator server 1220 did receive a request to accelerate a job, the method 1700 advances to block 1716, in which the orchestrator server 1220 identifies tasks within the job. In doing so, the orchestrator server 1220 may analyze the description of the job to identify tasks, as indicated in block 1718. In analyzing the description, and as indicated in block 1720, the orchestrator server 1220 may analyze the received code (e.g., the code from block 1710), to identify operations to be grouped into tasks (e.g., operations that would benefit from the same types of acceleration, such as cryptographic acceleration, data compression acceleration, etc.). As indicated in block 1722, the orchestrator server 1220 may determine types of acceleration for each task (e.g., cryptographic, data compression, etc.). In block 1724, the orchestrator server 1220 may determine a data dependence of the tasks, such as determining whether one task relies on the output of another tasks as input, or whether tasks may operate on independent data sets or independent portions of the same data set in parallel. In doing so, the orchestrator server 1220 may determine a subdivision of the tasks to operate on different portions of a data set concurrently (e.g., to compress different blocks of the same file), as indicated in block 1726. Referring briefly to FIG. 23, a set of data dependencies 2300 among tasks includes a Task D that depends on the output of a Task A and a Task B, which may be executed in parallel as they utilize independent data sets. Further, a Task E depends on the output of a Task C, which may be performed in parallel with Task A and Task B. Additionally, a Task F depends on the output of Task D and Task E, which may be performed in parallel. Referring back to FIG. 17, as indicated in block 1728, the orchestrator server 1220 may generate metadata indicative of the tasks within the job (e.g., the batch), the type of acceleration for each task, and the data dependencies, if any, between the tasks. Further, if the orchestrator server 1220 receives a request that identifies a workload phase associated with the job, the orchestrator server 1220, in block 1730, may associate the tasks within the job with the workload phase identifier. As such, in future iterations of the method 1700, the compute sled 1220 may identify the tasks merely from receiving the phase identifier from the compute sled 1220 rather than parsing the code to identify the tasks. Further, using the phase identifiers, the orchestrator server 1220 may predict when a phase will occur again by identifying patterns of phases over time, and preemptively schedule the tasks associated with a phase. Subsequently, the method 1700 advances to block 1732 of FIG. 18, in which the orchestrator server 1220 sends one or more availability requests to micro-orchestrators (e.g., the micro-orchestrators 1250, 1252) of one or more corresponding accelerator sleds (e.g., the accelerator sleds 1240, 1242).

Figure 18:
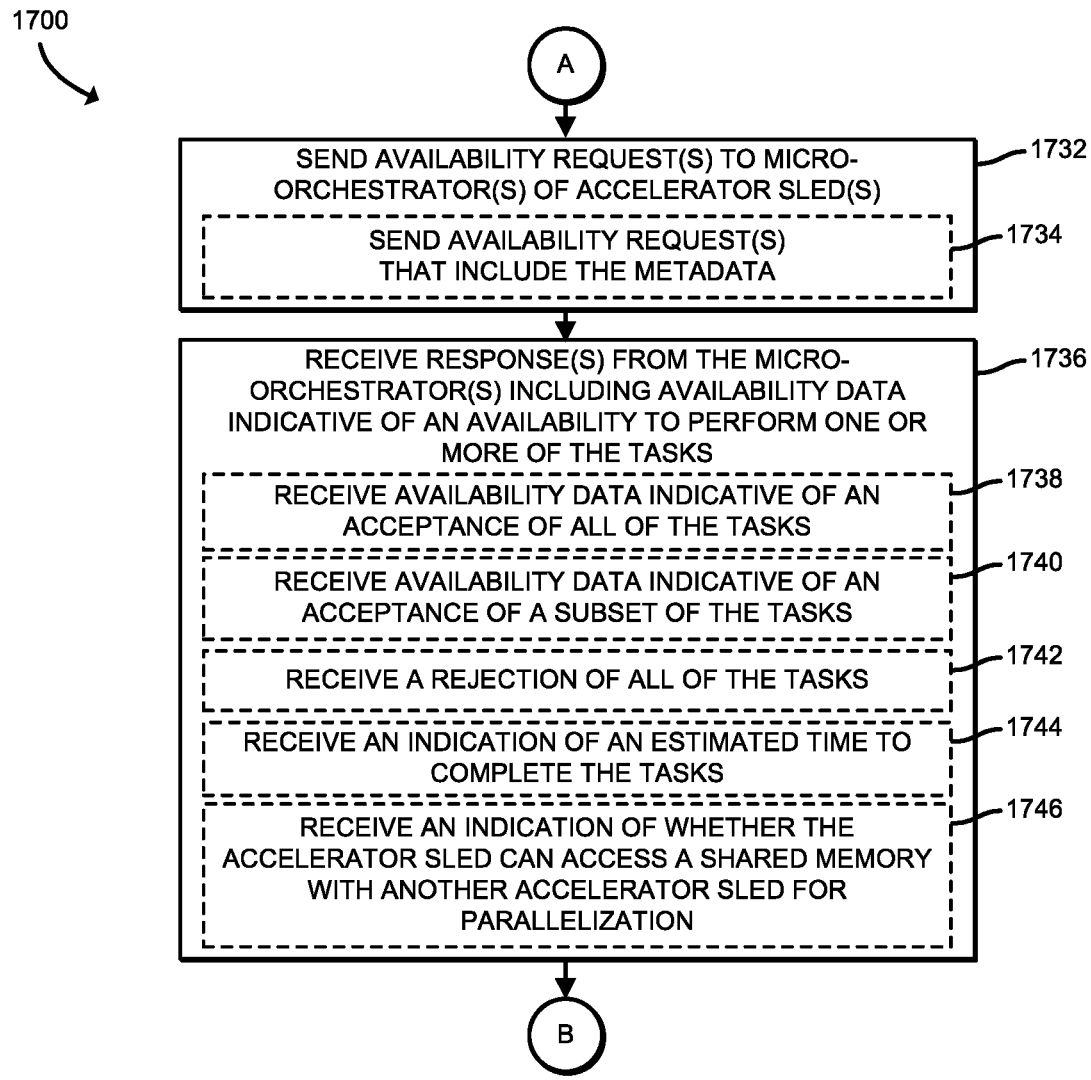

Referring now to FIG. 18, in sending the availability requests, the orchestrator server 1220, in the illustrative embodiment, includes the metadata in the availability requests, as indicated in block 1734. Afterwards, in block 1736, the orchestrator server 1220 receives responses from the micro-orchestrators 1250, 1252 including availability data indicative of an availability to perform one or more of the tasks. In doing so, the orchestrator server 1220 may receive availability data indicative of an acceptance by a micro-orchestrator (e.g., the micro-orchestrator 1250) of all of the tasks, as indicated in block 1738. As indicated in block 1740, the orchestrator server 1220 may receive availability data indicative of an acceptance of a subset of the tasks (e.g., each micro-orchestrator 1250, 1252 accepts a subset of the tasks). Alternatively, the orchestrator server 1220 may receive (e.g., from the micro-orchestrator 1250) a rejection of all of the tasks, as indicated in block 1742 (e.g., if the accelerator devices 1260, 1262 already have loads that satisfy a predefined threshold, such as 95% of their acceleration capacity). As indicated in block 1744, the orchestrator server 1220 may receive an indication of an estimated time to complete the tasks, if assigned to the corresponding micro-orchestrator 1250, 1252. In some embodiments, the orchestrator server 1220 may additionally receive an indication of whether an accelerator sled (e.g., the accelerator sled 1240) can access a shared memory with another accelerator sled (e.g., the accelerator sled 1242) for parallel acceleration of one or more of the tasks, as indicated in block 1746. Subsequently, the method 1700 advances to block 1748 of FIG. 19, in which the orchestrator server 1220 assigns tasks to one or more of the micro-orchestrators 1250, 1252 as a function of the availability data received in block 1736.

Figure 19:
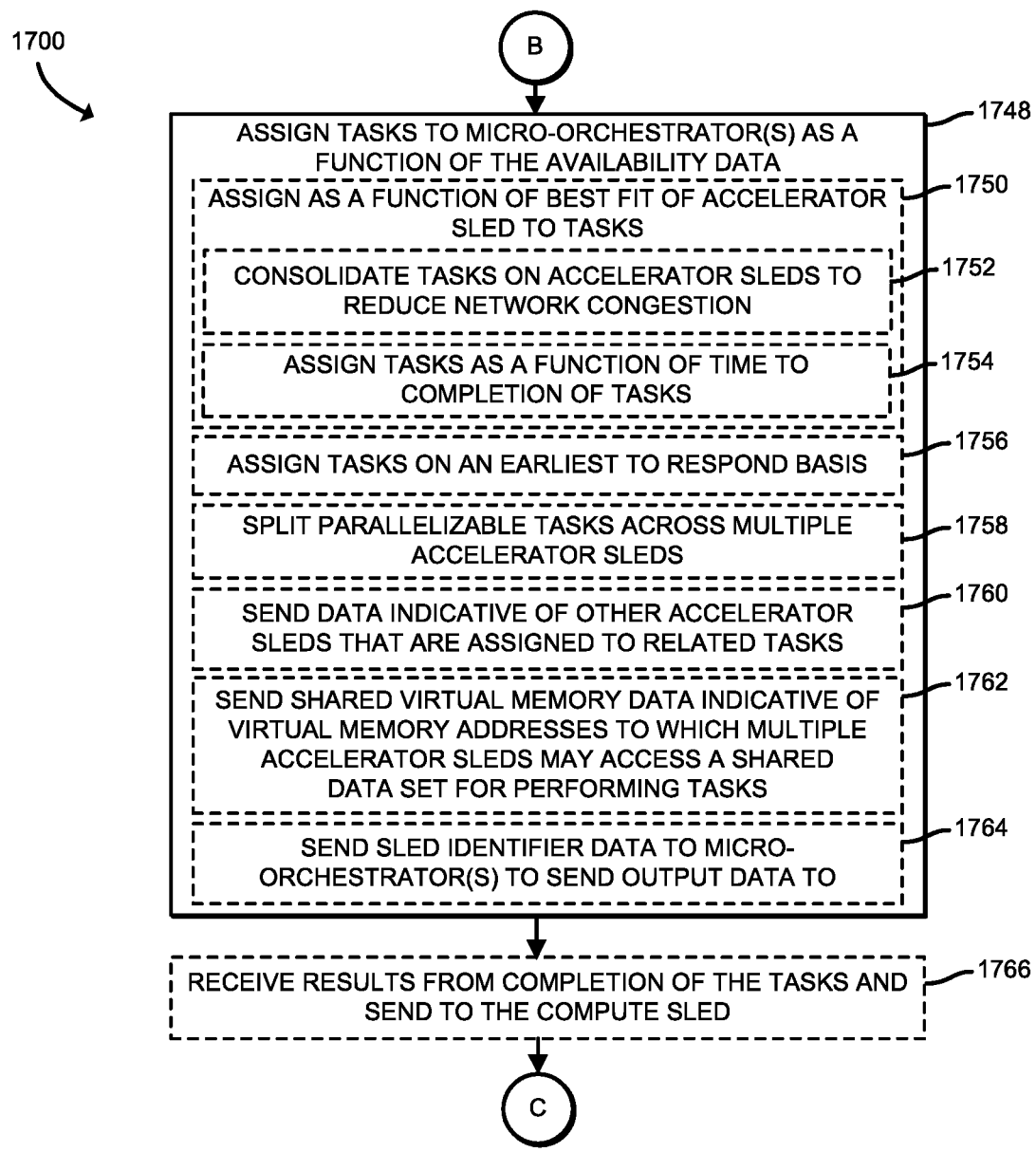

Referring now to FIG. 19, in assigning the tasks, the orchestrator server 1220 may assign the tasks as a function of the best fit of an accelerator sled 1240, 1242 to a set of tasks, as indicated in block 1750. For example, and as indicated in block 1752, the orchestrator server 1220 may consolidate tasks on an accelerator sled to reduce network congestion (e.g., consolidate, onto the accelerator sled 1240, tasks that the micro-orchestrator 1250 has reported an availability to perform, even though the micro-orchestrator 1252 may have reported an availability to perform one or more of those tasks). Doing so may reduce the amount of data exchanged through the network 1212 between tasks. As another example, and as indicated in block 1754, the orchestrator server 1220 may assign tasks as a function of the reported time to completion of the tasks, such as by assigning the tasks to the micro-orchestrator that reported that its corresponding accelerator sled would be able to complete the tasks in the least amount of time. Alternatively, and as indicated in block 1756, the orchestrator server 1220 may assign tasks on an earliest to respond basis (e.g., the orchestrator server 1220 may assign any tasks that the micro-orchestrator 1250 reported an availability to perform before the micro-orchestrator 1252 responds). As indicated in block 1758, the orchestrator server 1220 may split parallelizable tasks across multiple accelerator sleds. Additionally, as indicated in block 1760, the orchestrator server 1220 may send data indicative of other accelerator sleds that are assigned to related tasks. As indicated in block 1762, the orchestrator server 1220 may send shared virtual memory data indicative of virtual memory addresses to which multiple accelerator sleds may access a shared data set for performing two or more of the tasks. Further, as indicated in block 1764, the orchestrator server 1220 may send sled identifier data to the micro-orchestrators 1250, 1252 to indicate where to send output data to (e.g., the output of Task A should be sent to the micro-orchestrator 1252 as input to Task D, or that the output of Task F should be send to the compute sled 1230 as a final resulting data set for the job, etc.). Subsequently, in block 1766, the orchestrator server 1220 may receive results from the completion of the tasks and send the results to the compute sled 1230 (e.g., if the results are not sent by the accelerator sleds 1240, 1242 directly to the compute sled 1230). Afterwards, the method 1700 loops back to block 1702 of FIG. 17 in which the orchestrator server 1220 determines whether to continue to enable scheduling of batch jobs.

Figure 20:
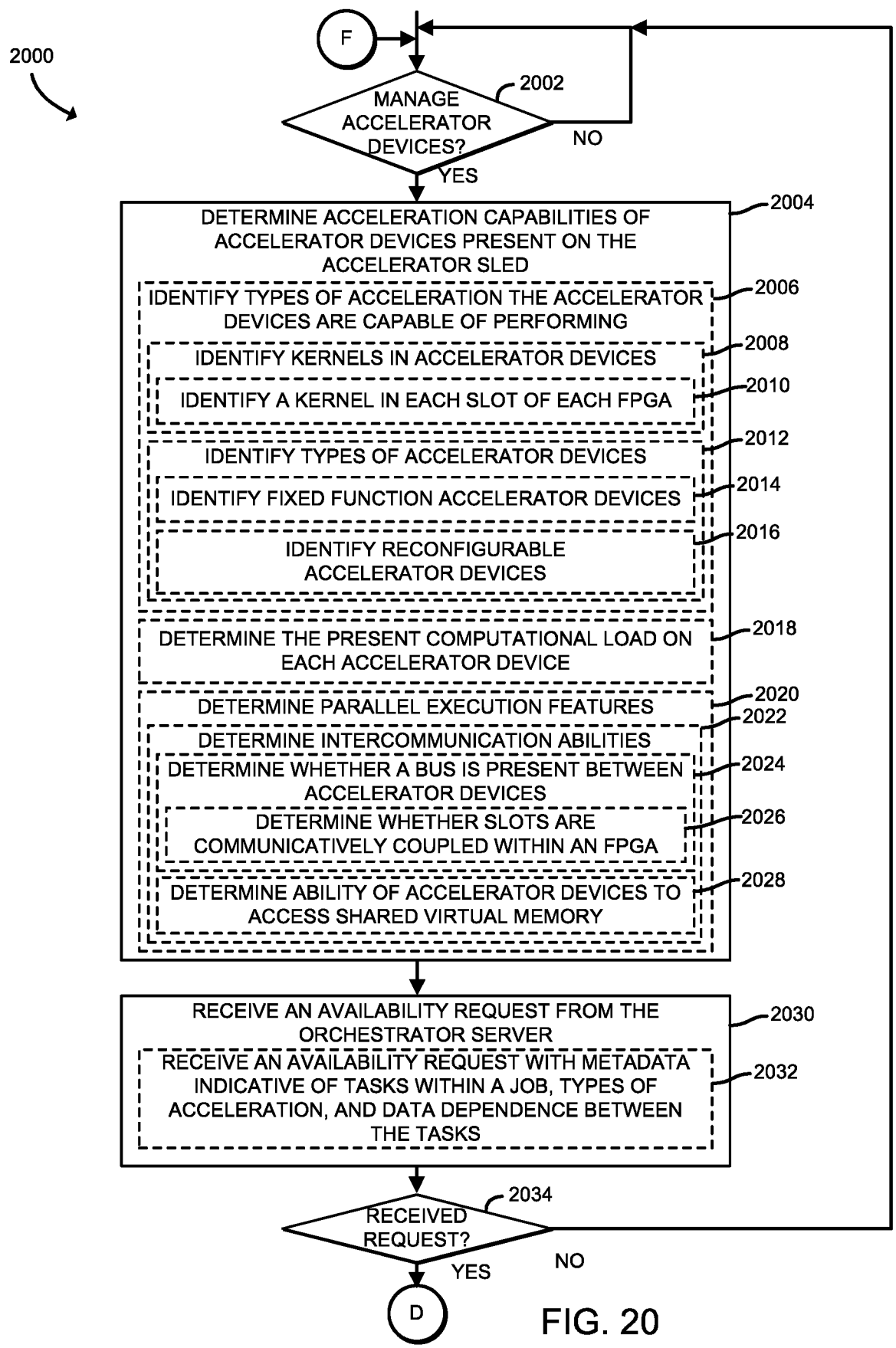
FIGS. 20-22 are a simplified flow diagram of at least one embodiment of a method for managing accelerator devices that may be performed by an accelerator sled of FIGS. 12 and 14.

Referring now to FIG. 20, an accelerator sled (e.g., the accelerator sled 1240), in operation, may execute a method 2000 to manage the accelerator devices 1260, 1262 to perform tasks. Though described herein as being performed by the accelerator sled 1240, it should be understood that, in the illustrative embodiment, the operations described below are performed by the micro-orchestrator logic unit 1250 of the accelerator sled 1240. The method 2000 begins with block 2002 in which the accelerator sled 1240 determines whether to manage the accelerator devices 1260, 1262. In the illustrative embodiment, the accelerator sled 1240 determines to manage the accelerator devices 1260, 1262 if the accelerator sled 1240 is powered on and communicatively coupled to the network 1212. In other embodiments, the accelerator sled 1240 may make the determination based on other factors. Regardless, in response to a determination to manage the accelerator devices 1260, 1262, the method 2000 advances to block 2004 in which the accelerator sled 1240 determines the acceleration capabilities of the accelerator devices 1260, 1262 present on the accelerator sled 1240. In doing so, the accelerator sled 1240 may identify types of acceleration the accelerator devices are capable of performing (e.g., cryptographic, compression, etc.), as indicated in block 2006. Further, in identifying the types of acceleration, the accelerator sled 1240 may identify kernels in the accelerator devices (e.g., the kernels 1270, 1272, 1274, 1276), as indicated in block 2008. In doing so, the accelerator sled 1240 may identify a kernel in each slot of each accelerator device 1260, 1262 (e.g., in cases in which the accelerator devices 1260, 1262 are FPGAs), as indicated in block 2010. Further, as indicated in block 2012, the accelerator sled 1240 may identify the type of each accelerator device 1260, 1262. In doing so, the accelerator sled 1240 may identify any fixed function accelerator devices (e.g., ASICs), as indicated in block 2014 and/or may identify any reconfigurable accelerator devices (e.g., FPGAs, graphics processing units (GPUs), etc.), as indicated in block 2016. Additionally or alternatively, the accelerator sled 1240 may determine the computational load on each accelerator device 1260, 1262, as indicated in block 2018.

As indicated in block 2020, the accelerator sled 1240 may determine the parallel execution features, if any, of the accelerator devices 1260, 1262. For example, and as indicated in block 2022, the accelerator sled 1240 may determine whether the accelerator devices 1260, 1262 have the capability to communicate with each other or other accelerator devices (e.g., on another accelerator sled 1242). In doing so, the accelerator sled 1240 may determine whether a bus (e.g., a high speed serial interconnect (HSSI)) is present between the accelerator devices 1260, 1262, as indicated in block 2024. Additionally, as indicated in block 2026, the accelerator sled 1240 may determine whether slots of an accelerator device (e.g., an FPGA) are communicatively coupled with each other. As indicated in block 2028, the accelerator sled 1240 may additionally determine whether the accelerator devices are capable of accessing a shared virtual memory.

Subsequently, the method 2000 advances to block 2030, in which the accelerator sled 1240 receives an availability request from the orchestrator server 1220. In doing so, and as indicated in block 2032, the accelerator sled 1240 may receive an availability request that includes metadata indicative of tasks within a job, types of acceleration associated with the tasks, and a data dependence between the tasks (e.g., the job metadata 1504, 1604 described above with reference to FIGS. 15 and 16). In block 2034, the accelerator sled 1240 determines the subsequent actions to take based on whether an availability request was received in block 2030. If not, the method 2000 loops back to block 2002, in which the accelerator sled 1240 determines whether to continue to manage accelerator devices. Otherwise, if an availability request was received, the method 2000 advances to block 2036 of FIG. 21, in which the accelerator sled 1240 determines an availability of the accelerator devices 1260, 1262 to perform the tasks.

Figure 21:
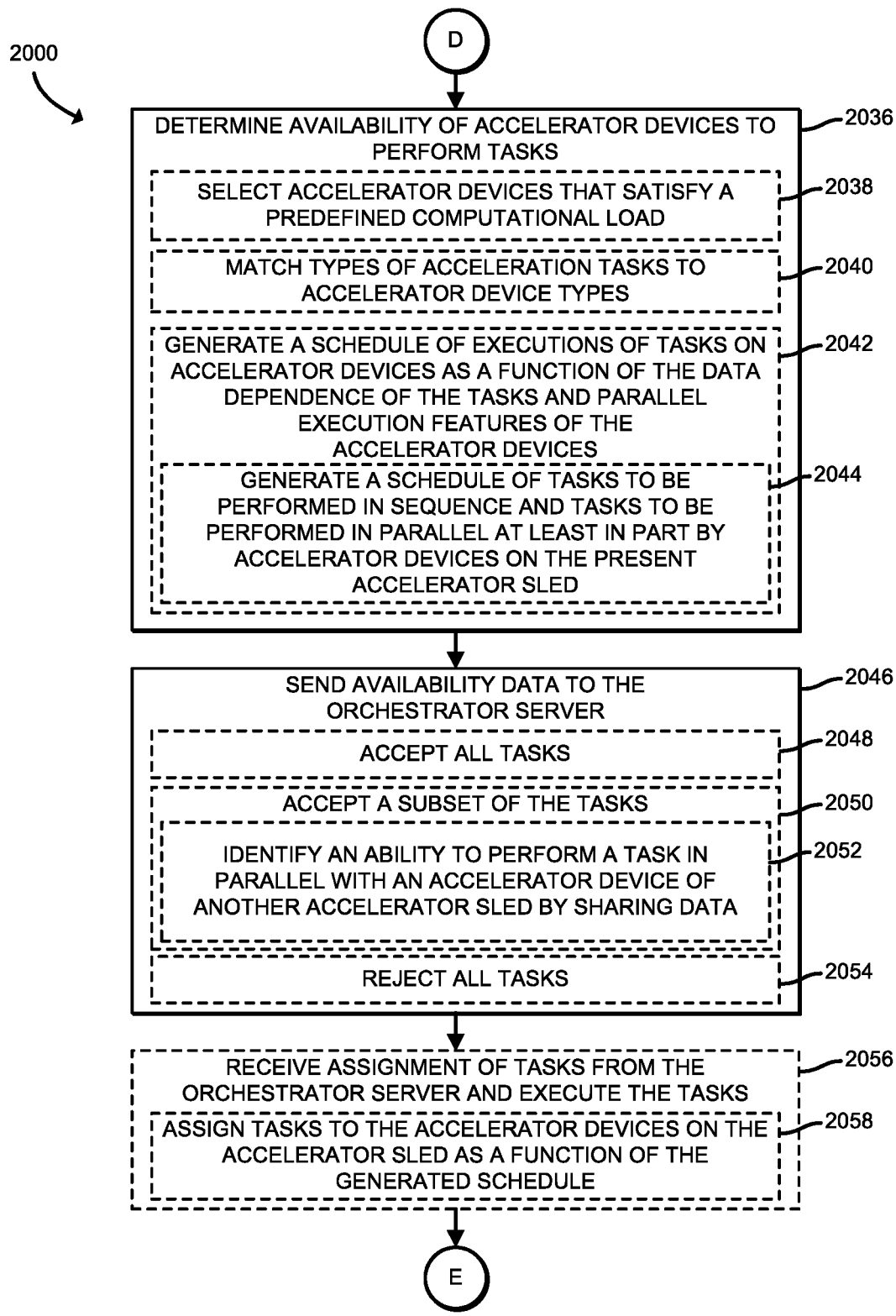

Referring now to FIG. 21, in determining the availability of the accelerator devices to perform the tasks, the accelerator sled 1240 may select accelerator devices that satisfy a predefined computational load, as indicated in block 2038. For example, the accelerator sled 1240 may select accelerator devices that presently have a computational load below 50% as potentially being available for a new task. As indicated in block 2040, the accelerator sled 1240 may match types of acceleration tasks to accelerator device types available on the accelerator sled 1240, such as matching a task that pertains to encryption operations to an encryption accelerator device. As indicated in block 2042, the accelerator sled 1240 may generate a schedule of executions of tasks on the accelerator devices as a function of the data dependence between the tasks and the parallel execution features of the accelerator devices 1260, 1262. In doing so, the accelerator sled 1240 may generate a schedule of tasks to be performed in sequence and tasks to be performed in parallel at least in part by accelerator devices on the present accelerator sled 1240, as indicated in block 2044. In some embodiments, the schedule may indicate that one or more tasks may be performed by another accelerator sled (e.g., the accelerator sled 1242) in parallel with a task executed on the accelerator sled 1240, such as if the accelerator devices 1260, 1262 on the present accelerator sled 1240 are able to access a shared virtual memory through the network 1212.

Subsequently, in block 2046, the accelerator sled 1240 sends availability data (e.g., the availability data 1506) to the orchestrator server 1220. In doing so, the accelerator sled 1240 may send availability data that indicates an acceptance of all of the tasks, as indicated in block 2048. Alternatively, the accelerator sled 1240 may send availability data that indicates acceptance of only a subset of the tasks (e.g., less than all of the tasks), as indicated in block 2050. In doing so, and as indicated in block 2052, the accelerator sled 1240 may include, in the availability data, an indication of an ability to perform a task in parallel with an accelerator device of another sled by sharing data, as described above with reference to the block 2044. Alternatively, as indicated in block 2054, the accelerator sled 1240 may send availability data indicating a rejection of all of the tasks (e.g., the accelerator devices are all too heavily loaded to take on additional tasks). Afterwards, in block 2056, the accelerator sled 1240 may receive an assignment of tasks from the orchestrator server 1220, and execute those assigned tasks. In doing so, and as indicated in block 2058, the accelerator sled 1240 may assign the tasks to the accelerator devices 1260, 1262 on the accelerator sled 1240 in accordance with the generated schedule (e.g., the schedule from block 2042). Subsequently, the method 2000 advances to block 2060 of FIG. 22 in which the accelerator sled 1240 may communicate with one or more other devices to share data.

Figure 22:
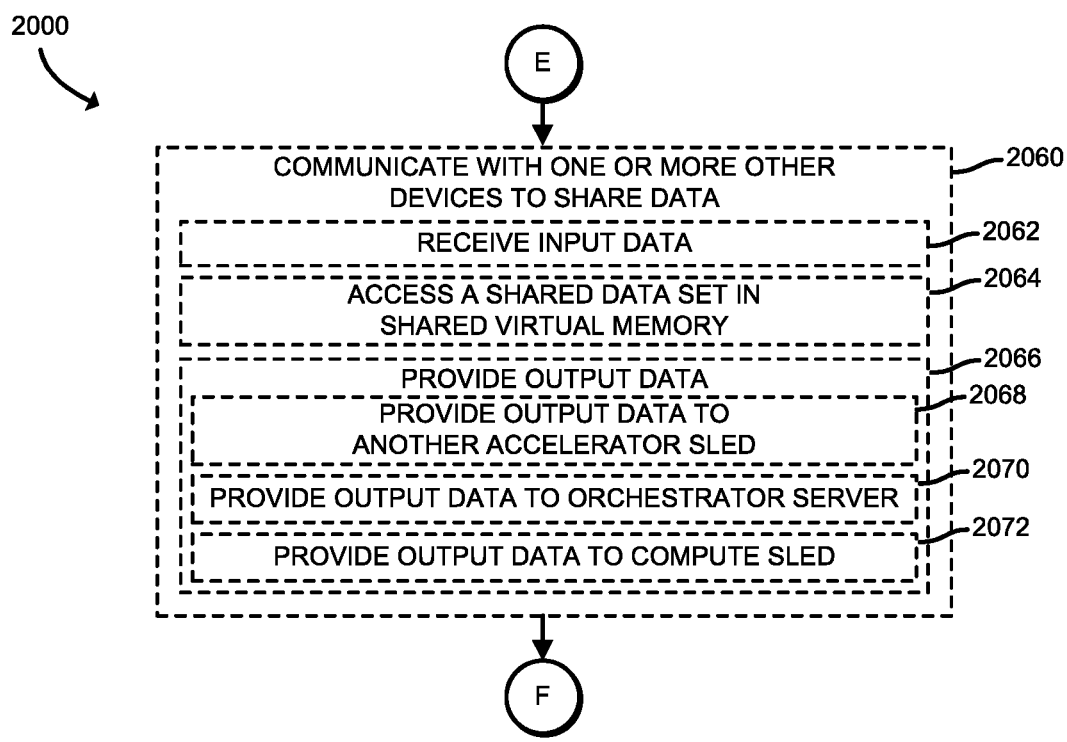

Referring now to FIG. 22, in communicating with one or more other devices, the accelerator sled 1240 may receive input data for a task, as indicated in block 2062. Additionally, the accelerator sled 1240 may access a shared data in a shared virtual memory, as indicated in block 2064. As indicated in block 2066, the accelerator sled 1240 may provide output data to another device (e.g., the output of a task). In doing so, the accelerator sled 1240 may provide output data to another accelerator sled (e.g., the accelerator sled 1242), as indicated in block 2068. Additionally or alternatively, the accelerator sled 1240 may provide output data to the orchestrator server 1220, as indicated in block 2070 and/or may provide the output data directly to the compute sled 1230, as indicated in block 2072. Subsequently, the method 2000 loops back to block 2002 of FIG. 20, in which the accelerator sled 1240 determines whether to continue to manage the accelerator devices 1260, 1262.

EXAMPLES

Illustrative examples of the technologies disclosed herein are provided below. An embodiment of the technologies may include any one or more, and any combination of, the examples described below.

Example 1 includes a compute device comprising a compute engine to receive a request from a compute sled to accelerate the execution of a job, wherein the job includes a set of tasks; analyze the request to generate metadata indicative of the tasks within the job, a type of acceleration associated with each task, and a data dependency between the tasks; send an availability request to a micro-orchestrator of an accelerator sled communicatively coupled to the compute device, wherein the availability request includes the metadata; receive availability data from the micro-orchestrators, wherein the availability data is indicative of which of the tasks the micro-orchestrator has accepted for acceleration on the associated accelerator sled; and assign the tasks to the micro-orchestrator as a function of the availability data.

Example 2 includes the subject matter of Example 1, and wherein to receive a request to accelerate a job comprises to receive a request that includes code indicative operations to be performed within the job; and wherein to analyze the request comprises to analyze the code to identify operations to be grouped into tasks.

Example 3 includes the subject matter of any of Examples 1 and 2, and wherein to analyze the request comprises to determine a type of acceleration for each task.

Example 4 includes the subject matter of any of Examples 1-3, and wherein to analyze the request comprises to determine a data dependence between the tasks.

Example 5 includes the subject matter of any of Examples 1-4, and wherein to determine the data dependence between the tasks comprises to determine a subdivision of the tasks to operate on different portions of a data set concurrently.

Example 6 includes the subject matter of any of Examples 1-5, and wherein to receive the request to accelerate a job comprises to receive a request that identifies a workload phase associated with the job; and wherein the compute engine is further to associate the tasks within the job with a workload phase identifier.

Example 7 includes the subject matter of any of Examples 1-6, and wherein to send an availability request to a micro-orchestrator comprises to send the availability request to multiple micro-orchestrators.

Example 8 includes the subject matter of any of Examples 1-7, and wherein to receive availability data from the micro-orchestrator comprises to receive an indication of an estimated time to complete the tasks accepted by a micro-orchestrator.

Example 9 includes the subject matter of any of Examples 1-8, and wherein to receive availability data from the micro-orchestrator comprises to receive an indication of whether an accelerator sled associated with the micro-orchestrator can access a shared memory with another accelerator sled for parallel execution of one or more of the tasks.

Example 10 includes the subject matter of any of Examples 1-9, and wherein the accelerator sled is one of a plurality of accelerator sleds and wherein to assign the tasks to the micro-orchestrator comprises to assign the tasks as a function of a best fit of each associated accelerated sled to the tasks.

Example 11 includes the subject matter of any of Examples 1-10, and wherein to assign the tasks as a function of a best fit of each associated accelerated sled comprises to consolidate tasks on the associated accelerator sleds to reduce network congestion.

Example 12 includes the subject matter of any of Examples 1-11, and wherein to assign the tasks as a function of a best fit of each associated accelerated sled comprises to assign the tasks as a function of estimated time completion of each task.

Example 13 includes the subject matter of any of Examples 1-12, and wherein to assign the task to the micro-orchestrator comprises to split parallelizable tasks across multiple accelerator sleds.

Example 14 includes the subject matter of any of Examples 1-13, and wherein to assign the tasks comprises to send, to multiple micro-orchestrators of multiple accelerator sleds communicatively coupled to the compute device, data indicative of other accelerator sleds that are assigned to related tasks.

Example 15 includes the subject matter of any of Examples 1-14, and wherein to assign the tasks comprises to send shared virtual memory data indicative of virtual memory addresses to which multiple accelerator sleds may access a shared data for performing tasks.

Example 16 includes the subject matter of any of Examples 1-15, and wherein to assign the tasks comprises to send compute sled identifier data to the micro-orchestrators to send output data to.

Example 17 includes a method comprising receiving, by a compute device, a request from a compute sled to accelerate the execution of a job, wherein the job includes a set of tasks; analyzing, by the compute device, the request to generate metadata indicative of the tasks within the job, a type of acceleration associated with each task, and a data dependency between the tasks; sending, by the compute device, an availability request to a micro-orchestrator of an accelerator sled communicatively coupled to the compute device, wherein the availability request includes the metadata; receiving, by the compute device, availability data from the micro-orchestrator, wherein the availability data is indicative of which of the tasks the micro-orchestrator has accepted for acceleration on the associated accelerator sled; and assigning, by the compute device, the tasks to the micro-orchestrator as a function of the availability data.

Example 18 includes the subject matter of Example 17, and wherein receiving a request to accelerate a job comprises receiving a request that includes code indicative operations to be performed within the job; and wherein analyzing the request comprises analyzing the code to identify operations to be grouped into tasks.

Example 19 includes the subject matter of any of Examples 17 and 18, and wherein analyzing the request comprises determining a type of acceleration for each task.

Example 20 includes the subject matter of any of Examples 17-19, and wherein analyzing the request comprises determining a data dependence between the tasks.

Example 21 includes the subject matter of any of Examples 17-20, and wherein determining the data dependence between the tasks comprises determining a subdivision of the tasks to operate on different portions of a data set concurrently.

Example 22 includes the subject matter of any of Examples 17-21, and wherein receiving the request to accelerate a job comprises receiving a request that identifies a workload phase associated with the job; and the method further comprising associating, by the compute device, the tasks within the job with a workload phase identifier.

Example 23 includes the subject matter of any of Examples 17-22, and wherein sending an availability request to a micro-orchestrator comprises sending the availability request to multiple micro-orchestrators.

Example 24 includes the subject matter of any of Examples 17-23, and wherein receiving availability data from the micro-orchestrators comprises receiving an indication of an estimated time to complete the tasks accepted by the micro-orchestrator.

Example 25 includes the subject matter of any of Examples 17-24, and wherein receiving availability data from the micro-orchestrator comprises receiving an indication of whether an accelerator sled associated with the micro-orchestrator can access a shared memory with another accelerator sled for parallel execution of one or more of the tasks.

Example 26 includes the subject matter of any of Examples 17-25, and wherein the accelerator sled is one of a plurality of accelerator sleds and wherein assigning the tasks to the micro-orchestrator comprises assigning the tasks as a function of a best fit of each associated accelerated sled to the tasks.

Example 27 includes the subject matter of any of Examples 17-26, and wherein assigning the tasks as a function of a best fit of each associated accelerated sled comprises consolidating tasks on the associated accelerator sleds to reduce network congestion.

Example 28 includes the subject matter of any of Examples 17-27, and wherein assigning the tasks as a function of a best fit of each associated accelerated sled comprises assigning the tasks as a function of estimated time completion of each task.

Example 29 includes the subject matter of any of Examples 17-28, and wherein assigning the tasks to micro-orchestrator comprises splitting parallelizable tasks across multiple accelerator sleds.

Example 30 includes the subject matter of any of Examples 17-29, and wherein assigning the tasks comprises sending, to multiple micro-orchestrators of multiple accelerator sleds communicatively coupled to the compute device, data indicative of other accelerator sleds that are assigned to related tasks.

Example 31 includes the subject matter of any of Examples 17-30, and wherein assigning the tasks comprises sending shared virtual memory data indicative of virtual memory addresses to which multiple accelerator sleds may access a shared data set for performing tasks.

Example 32 includes the subject matter of any of Examples 17-31, and wherein assigning the tasks comprises sending compute sled identifier data to one or more of the micro-orchestrators to send output data to.

Example 33 includes one or more machine-readable storage media comprising a plurality of instructions stored thereon that, in response to being executed, cause a compute device to perform the method of any of Examples 17-32.

Example 34 includes a compute device comprising means for performing the method of any of Examples 17-32.

Example 35 includes a compute device comprising one or more processors; one or more memory devices having stored therein a plurality of instructions that, when executed by the one or more processors, cause the network switch to perform the method of any of Examples 17-32.

Example 36 includes a compute device comprising network communicator circuitry to receive a request from a compute sled to accelerate the execution of a job, wherein the job includes a set of tasks; and batch manager circuitry to analyze the request to generate metadata indicative of the tasks within the job, a type of acceleration associated with each task, and a data dependency between the tasks; send an availability request to a micro-orchestrator of an accelerator sled communicatively coupled to the compute device, wherein the availability request includes the metadata; receive availability data from the micro-orchestrators, wherein the availability data is indicative of which of the tasks the micro-orchestrator has accepted for acceleration on the associated accelerator sled; and assign the tasks to the micro-orchestrator as a function of the availability data.

Example 37 includes the subject matter of Example 36, and wherein to receive a request to accelerate a job comprises to receive a request that includes code indicative operations to be performed within the job; and wherein to analyze the request comprises to analyze the code to identify operations to be grouped into tasks.

Example 38 includes the subject matter of any of Examples 36 and 37, and wherein to analyze the request comprises to determine a type of acceleration for each task.

Example 39 includes the subject matter of any of Examples 36-38, and wherein to analyze the request comprises to determine a data dependence between the tasks.

Example 40 includes the subject matter of any of Examples 36-39, and wherein to determine the data dependence between the tasks comprises to determine a subdivision of the tasks to operate on different portions of a data set concurrently.

Example 41 includes the subject matter of any of Examples 36-40, and wherein to receive the request to accelerate a job comprises to receive a request that identifies a workload phase associated with the job; and wherein the compute engine is further to associate the tasks within the job with a workload phase identifier.

Example 42 includes the subject matter of any of Examples 36-41, and wherein to send an availability request to a micro-orchestrator comprises to send the availability request to multiple micro-orchestrators.

Example 43 includes the subject matter of any of Examples 36-42, and wherein to receive availability data from the micro-orchestrator comprises to receive an indication of an estimated time to complete the tasks accepted by a micro-orchestrator.

Example 44 includes the subject matter of any of Examples 36-43, and wherein to receive availability data from the micro-orchestrator comprises to receive an indication of whether an accelerator sled associated with the micro-orchestrator can access a shared memory with another accelerator sled for parallel execution of one or more of the tasks.

Example 45 includes the subject matter of any of Examples 36-44, and wherein the accelerator sled is one of a plurality of accelerator sleds and wherein to assign the tasks to the micro-orchestrator comprises to assign the tasks as a function of a best fit of each associated accelerated sled to the tasks.

Example 46 includes the subject matter of any of Examples 36-45, and wherein to assign the tasks as a function of a best fit of each associated accelerated sled comprises to consolidate tasks on the associated accelerator sleds to reduce network congestion.

Example 47 includes the subject matter of any of Examples 36-46, and wherein to assign the tasks as a function of a best fit of each associated accelerated sled comprises to assign the tasks as a function of estimated time completion of each task.

Example 48 includes the subject matter of any of Examples 36-47, and wherein to assign the task to the micro-orchestrator comprises to split parallelizable tasks across multiple accelerator sleds.

Example 49 includes the subject matter of any of Examples 36-48, and wherein to assign the tasks comprises to send, to multiple micro-orchestrators of multiple accelerator sleds communicatively coupled to the compute device, data indicative of other accelerator sleds that are assigned to related tasks.

Example 50 includes the subject matter of any of Examples 36-49, and wherein to assign the tasks comprises to send shared virtual memory data indicative of virtual memory addresses to which multiple accelerator sleds may access a shared data for performing tasks.

Example 51 includes the subject matter of any of Examples 36-50, and wherein to assign the tasks comprises to send compute sled identifier data to the micro-orchestrators to send output data to.

Example 52 includes a compute device comprising circuitry for receiving a request from a compute sled to accelerate the execution of a job, wherein the job includes a set of tasks; means for analyzing the request to generate metadata indicative of the tasks within the job, a type of acceleration associated with each task, and a data dependency between the tasks; circuitry for sending an availability request to a micro-orchestrator of an accelerator sled communicatively coupled to the compute device, wherein the availability request includes the metadata; circuitry for receiving availability data from the micro-orchestrator, wherein the availability data is indicative of which of the tasks the micro-orchestrator has accepted for acceleration on the associated accelerator sled; and means for assigning the tasks to the micro-orchestrator as a function of the availability data.

Example 53 includes the subject matter of Example 52, and wherein the circuitry for receiving a request to accelerate a job comprises circuitry for receiving a request that includes code indicative operations to be performed within the job; and wherein the means for analyzing the request comprises circuitry for analyzing the code to identify operations to be grouped into tasks.

Example 54 includes the subject matter of any of Examples 52 and 53, and wherein the means for analyzing the request comprises circuitry for determining a type of acceleration for each task.

Example 55 includes the subject matter of any of Examples 52-54, and wherein the means for analyzing the request comprises circuitry for determining a data dependence between the tasks.

Example 56 includes the subject matter of any of Examples 52-55, and wherein the means for determining the data dependence between the tasks comprises circuitry for determining a subdivision of the tasks to operate on different portions of a data set concurrently.

Example 57 includes the subject matter of any of Examples 52-56, and wherein the circuitry for receiving the request to accelerate a job comprises circuitry for receiving a request that identifies a workload phase associated with the job; and the compute device further comprising circuitry for associating the tasks within the job with a workload phase identifier.

Example 58 includes the subject matter of any of Examples 52-57, and wherein the circuitry for sending an availability request to a micro-orchestrator comprises circuitry for sending the availability request to multiple micro-orchestrators.

Example 59 includes the subject matter of any of Examples 52-58, and wherein the circuitry for receiving availability data from the micro-orchestrators comprises circuitry for receiving an indication of an estimated time to complete the tasks accepted by the micro-orchestrator.

Example 60 includes the subject matter of any of Examples 52-59, and wherein the circuitry for receiving availability data from the micro-orchestrator comprises circuitry for receiving an indication of whether an accelerator sled associated with the micro-orchestrator can access a shared memory with another accelerator sled for parallel execution of one or more of the tasks.

Example 61 includes the subject matter of any of Examples 52-60, and wherein the accelerator sled is one of a plurality of accelerator sleds and wherein the means for assigning the tasks to the micro-orchestrator comprises circuitry for assigning the tasks as a function of a best fit of each associated accelerated sled to the tasks.

Example 62 includes the subject matter of any of Examples 52-61, and wherein the means for assigning the tasks as a function of a best fit of each associated accelerated sled comprises circuitry for consolidating tasks on the associated accelerator sleds to reduce network congestion.

Example 63 includes the subject matter of any of Examples 52-62, and wherein the means for assigning the tasks as a function of a best fit of each associated accelerated sled comprises circuitry for assigning the tasks as a function of estimated time completion of each task.

Example 64 includes the subject matter of any of Examples 52-63, and wherein the means for assigning the tasks to micro-orchestrator comprises circuitry for splitting parallelizable tasks across multiple accelerator sleds.

Example 65 includes the subject matter of any of Examples 52-64, and wherein the means for assigning the tasks comprises circuitry for sending, to multiple micro-orchestrators of multiple accelerator sleds communicatively coupled to the compute device, data indicative of other accelerator sleds that are assigned to related tasks.

Example 66 includes the subject matter of any of Examples 52-65, and wherein the means for assigning the tasks comprises circuitry for sending shared virtual memory data indicative of virtual memory addresses at which multiple accelerator sleds may access a shared data set for performing tasks.

Example 67 includes the subject matter of any of Examples 52-66, and wherein the means for assigning the tasks comprises circuitry for sending compute sled identifier data to one or more of the micro-orchestrators to send output data to.

Example 68 includes an accelerator sled comprising a compute engine; and a set of accelerator devices; wherein the compute engine is to determine acceleration capabilities of the set of accelerator devices; receive an availability request from a compute device, wherein the availability request includes metadata indicative of a set of tasks to be accelerated, a type of acceleration associated with each of the tasks, and a data dependence between the tasks; determine an availability of the accelerator devices to accelerate one or more of the tasks as a function of the determined acceleration capabilities and the metadata; obtain an assignment of the accelerator devices to one or more of the tasks as a function of the determined availability; and execute the one or more of the tasks with one or more of the accelerator devices as a function of the obtained assignment.

Example 69 includes the subject matter of Example 68, and wherein the compute engine includes a micro-orchestrator logic unit, and wherein to determine the acceleration capabilities of the set of accelerator devices comprises to determine, with the micro-orchestrator logic unit, the acceleration capabilities; to determine an availability of the accelerator devices comprises to determine, with the micro-orchestrator logic unit, the availability of the accelerator devices; and to obtain an assignment of the accelerator devices comprises to obtain, with the micro-orchestrator logic unit, the assignment of the accelerator devices to the one or more tasks.

Example 70 includes the subject matter of any of Examples 68 and 69, and wherein to determine acceleration capabilities of the set of accelerator devices comprises to identify types of acceleration the accelerator devices are capable of performing.

Example 71 includes the subject matter of any of Examples 68-70, and wherein to identify the types of acceleration the accelerator devices are capable of performing comprises identifying a kernel of an accelerator device.

Example 72 includes the subject matter of any of Examples 68-71, and wherein to identify a kernel of an accelerator device comprises to identify a kernel in each of multiple slots of a field programmable gate array (FPGA).

Example 73 includes the subject matter of any of Examples 68-72, and wherein to determine acceleration capabilities of the set of accelerator devices comprises to determine whether each accelerator device is a fixed function accelerator device or a reconfigurable accelerator device.

Example 74 includes the subject matter of any of Examples 68-73, and wherein to determine the acceleration capabilities of the set of accelerator devices comprises to determine the present computational load on each accelerator device.

Example 75 includes the subject matter of any of Examples 68-74, and wherein to determine acceleration capabilities of the set of accelerator devices comprises to determine an intercommunication ability of the accelerator devices.

Example 76 includes the subject matter of any of Examples 68-75, and wherein to determine an intercommunication ability of the accelerator devices comprises to determine whether a bus is present between two or more of the accelerator devices.

Example 77 includes the subject matter of any of Examples 68-76, and wherein to determine an intercommunication ability of the accelerator devices comprises to determine whether one of the accelerator devices includes multiple slots that are communicatively coupled to each other.

Example 78 includes the subject matter of any of Examples 68-77, and wherein to determine an intercommunication ability of the accelerator devices comprises to determine an ability of the accelerator devices to access shared virtual memory.

Example 79 includes the subject matter of any of Examples 68-78, and wherein to determine an availability of the accelerator devices to accelerate one or more of the tasks comprises to select one or more accelerator devices that satisfy a predefined computational load.

Example 80 includes the subject matter of any of Examples 68-79, and wherein to determine an availability of the accelerator devices to accelerate one or more of the tasks comprises to match the types of the accelerator tasks to the accelerator device types.

Example 81 includes the subject matter of any of Examples 68-80, and wherein the compute engine is further to generate a schedule of executions of tasks on the accelerator devices as a function of the data dependence of the tasks and parallel acceleration features of the accelerator devices.

Example 82 includes the subject matter of any of Examples 68-81, and wherein to obtain an assignment of the accelerator devices to one or more of the tasks comprises to send availability data to the compute device, wherein the availability data is indicative of which of the tasks the compute engine has accepted for acceleration on the associated accelerator sled; and receive an assignment of the tasks from the compute device.

Example 83 includes the subject matter of any of Examples 68-82, and wherein the compute engine is further to communicate with one or more other sleds to share data associated with the tasks.

Example 84 includes a method comprising determining, by an accelerator sled, acceleration capabilities of a set of accelerator devices of the accelerator sled; receiving, by the accelerator sled, an availability request from a compute device, wherein the availability request includes metadata indicative of a set of tasks to be accelerated, a type of acceleration associated with each of the tasks, and a data dependence between the tasks; determining, by the accelerator sled, an availability of the accelerator devices to accelerate one or more of the tasks as a function of the determined acceleration capabilities and the metadata; obtaining, by the accelerator sled, an assignment of the accelerator devices to one or more of the tasks as a function of the determined availability; and executing, by the accelerator sled, the one or more of the tasks with one or more of the accelerator devices as a function of the obtained assignment.

Example 85 includes the subject matter of Example 84, and wherein determining the acceleration capabilities of the set of accelerator devices comprises determining, with a micro-orchestrator logic unit of the accelerator sled, the acceleration capabilities; determining an availability of the accelerator devices comprises determining, with the micro-orchestrator logic unit, the availability of the accelerator devices; and obtaining an assignment of the accelerator devices comprises obtaining, with the micro-orchestrator logic unit, the assignment of the accelerator devices to the one or more tasks.

Example 86 includes the subject matter of any of Examples 84 and 85, and wherein determining acceleration capabilities of the set of accelerator devices comprises identifying types of acceleration the accelerator devices are capable of performing.

Example 87 includes the subject matter of any of Examples 84-86, and wherein identifying the types of acceleration the accelerator devices are capable of performing comprises identifying a kernel of an accelerator device.

Example 88 includes the subject matter of any of Examples 84-87, and wherein identifying a kernel of an accelerator device comprises identifying a kernel in each of multiple slots of a field programmable gate array (FPGA).

Example 89 includes the subject matter of any of Examples 84-88, and wherein determining acceleration capabilities of the set of accelerator devices comprises determining whether each accelerator device is a fixed function accelerator device or a reconfigurable accelerator device.

Example 90 includes the subject matter of any of Examples 84-89, and wherein determining the acceleration capabilities of the set of accelerator devices comprises determining the present computational load on each accelerator device.

Example 91 includes the subject matter of any of Examples 84-90, and wherein determining acceleration capabilities of the set of accelerator devices comprises determining an intercommunication ability of the accelerator devices.

Example 92 includes the subject matter of any of Examples 84-91, and wherein determining an intercommunication ability of the accelerator devices comprises determining whether a bus is present between two or more of the accelerator devices.

Example 93 includes the subject matter of any of Examples 84-92, and wherein determining an intercommunication ability of the accelerator devices comprises determining whether one of the accelerator devices includes multiple slots that are communicatively coupled to each other.

Example 94 includes the subject matter of any of Examples 84-93, and wherein determining an intercommunication ability of the accelerator devices comprises determining an ability of the accelerator devices to access shared virtual memory.

Example 95 includes the subject matter of any of Examples 84-94, and wherein determining an availability of the accelerator devices to accelerate one or more of the tasks comprises selecting one or more accelerator devices that satisfy a predefined computational load.

Example 96 includes the subject matter of any of Examples 84-95, and wherein determining an availability of the accelerator devices to accelerate one or more of the tasks comprises matching the types of the accelerator tasks to the accelerator device types.

Example 97 includes the subject matter of any of Examples 84-96, and further including generating, by the accelerator sled, a schedule of executions of tasks on the accelerator devices as a function of the data dependence of the tasks and parallel acceleration features of the accelerator devices.

Example 98 includes the subject matter of any of Examples 84-97, and wherein obtaining an assignment of the accelerator devices to one or more of the tasks comprises sending availability data to the compute device, wherein the availability data is indicative of which of the tasks the compute engine has accepted for acceleration on the associated accelerator sled; and receiving an assignment of the tasks from the compute device.

Example 99 includes the subject matter of any of Examples 84-98, and further including communicating, by the accelerator sled, with one or more other sleds to share data associated with the tasks.

Example 100 includes one or more machine-readable storage media comprising a plurality of instructions stored thereon that, in response to being executed, cause an accelerator sled to perform the method of any of Examples 84-99.

Example 101 includes an accelerator sled comprising means for performing the method of any of Examples 84-99.

Example 102 includes an accelerator sled comprising a compute engine to perform the method of any of Examples 84-99.

Example 103 includes an accelerator sled comprising a set of accelerator devices acceleration manager circuitry to determine acceleration capabilities of the set of accelerator devices; and network communicator circuitry to receive an availability request from a compute device, wherein the availability request includes metadata indicative of a set of tasks to be accelerated, a type of acceleration associated with each of the tasks, and a data dependence between the tasks; wherein the acceleration manager circuitry is further to determine an availability of the accelerator devices to accelerate one or more of the tasks as a function of the determined acceleration capabilities and the metadata; obtain an assignment of the accelerator devices to one or more of the tasks as a function of the determined availability; and execute the one or more of the tasks with one or more of the accelerator devices as a function of the obtained assignment.

Example 104 includes the subject matter of Example 103, and wherein the acceleration manager circuitry includes a micro-orchestrator logic unit, and wherein to determine the acceleration capabilities of the set of accelerator devices comprises to determine, with the micro-orchestrator logic unit, the acceleration capabilities; to determine an availability of the accelerator devices comprises to determine, with the micro-orchestrator logic unit, the availability of the accelerator devices; and to obtain an assignment of the accelerator devices comprises to obtain, with the micro-orchestrator logic unit, the assignment of the accelerator devices to the one or more tasks.

Example 105 includes the subject matter of any of Examples 103 and 104, and wherein to determine acceleration capabilities of the set of accelerator devices comprises to identify types of acceleration the accelerator devices are capable of performing.

Example 106 includes the subject matter of any of Examples 103-105, and wherein to identify the types of acceleration the accelerator devices are capable of performing comprises identifying a kernel of an accelerator device.

Example 107 includes the subject matter of any of Examples 103-106, and wherein to identify a kernel of an accelerator device comprises to identify a kernel in each of multiple slots of a field programmable gate array (FPGA).

Example 108 includes the subject matter of any of Examples 103-107, and wherein to determine acceleration capabilities of the set of accelerator devices comprises to determine whether each accelerator device is a fixed function accelerator device or a reconfigurable accelerator device.

Example 109 includes the subject matter of any of Examples 103-108, and wherein to determine the acceleration capabilities of the set of accelerator devices comprises to determine the present computational load on each accelerator device.

Example 110 includes the subject matter of any of Examples 103-109, and wherein to determine acceleration capabilities of the set of accelerator devices comprises to determine an intercommunication ability of the accelerator devices.

Example 111 includes the subject matter of any of Examples 103-110, and wherein to determine an intercommunication ability of the accelerator devices comprises to determine whether a bus is present between two or more of the accelerator devices.

Example 112 includes the subject matter of any of Examples 103-111, and wherein to determine an intercommunication ability of the accelerator devices comprises to determine whether one of the accelerator devices includes multiple slots that are communicatively coupled to each other.

Example 113 includes the subject matter of any of Examples 103-112, and wherein to determine an intercommunication ability of the accelerator devices comprises to determine an ability of the accelerator devices to access shared virtual memory.

Example 114 includes the subject matter of any of Examples 103-113, and wherein to determine an availability of the accelerator devices to accelerate one or more of the tasks comprises to select one or more accelerator devices that satisfy a predefined computational load.

Example 115 includes the subject matter of any of Examples 103-114, and wherein to determine an availability of the accelerator devices to accelerate one or more of the tasks comprises to match the types of the accelerator tasks to the accelerator device types.

Example 116 includes the subject matter of any of Examples 103-115, and wherein the acceleration manager circuitry is further to generate a schedule of executions of tasks on the accelerator devices as a function of the data dependence of the tasks and parallel acceleration features of the accelerator devices.

Example 117 includes the subject matter of any of Examples 103-116, and wherein to obtain an assignment of the accelerator devices to one or more of the tasks comprises to send availability data to the compute device, wherein the availability data is indicative of which of the tasks the compute engine has accepted for acceleration on the associated accelerator sled; and receive an assignment of the tasks from the compute device.

Example 118 includes the subject matter of any of Examples 103-117, and wherein the network communicator circuitry is further to communicate with one or more other sleds to share data associated with the tasks.

Example 119 includes a compute device comprising means for determining acceleration capabilities of a set of accelerator devices of the accelerator sled; circuitry for receiving an availability request from a compute device, wherein the availability request includes metadata indicative of a set of tasks to be accelerated, a type of acceleration associated with each of the tasks, and a data dependence between the tasks; circuitry for determining an availability of the accelerator devices to accelerate one or more of the tasks as a function of the determined acceleration capabilities and the metadata; circuitry for obtaining an assignment of the accelerator devices to one or more of the tasks as a function of the determined availability; and circuitry for executing the one or more of the tasks with one or more of the accelerator devices as a function of the obtained assignment.

Example 120 includes the subject matter of Example 119, and wherein the means for determining the acceleration capabilities of the set of accelerator devices comprises circuitry for determining, with a micro-orchestrator logic unit of the accelerator sled, the acceleration capabilities; the circuitry for determining an availability of the accelerator devices comprises circuitry for determining, with the micro-orchestrator logic unit, the availability of the accelerator devices; and the circuitry for obtaining an assignment of the accelerator devices comprises circuitry for obtaining, with the micro-orchestrator logic unit, the assignment of the accelerator devices to the one or more tasks.

Example 121 includes the subject matter of any of Examples 119 and 120, and wherein the means for determining acceleration capabilities of the set of accelerator devices comprises circuitry for identifying types of acceleration the accelerator devices are capable of performing.

Example 122 includes the subject matter of any of Examples 119-121, and wherein the circuitry for identifying the types of acceleration the accelerator devices are capable of performing comprises circuitry for identifying a kernel of an accelerator device.

Example 123 includes the subject matter of any of Examples 119-122, and wherein the circuitry for identifying a kernel of an accelerator device comprises circuitry for identifying a kernel in each of multiple slots of a field programmable gate array (FPGA).

Example 124 includes the subject matter of any of Examples 119-123, and wherein the means for determining acceleration capabilities of the set of accelerator devices comprises circuitry for determining whether each accelerator device is a fixed function accelerator device or a reconfigurable accelerator device.

Example 125 includes the subject matter of any of Examples 119-124, and wherein the means for determining the acceleration capabilities of the set of accelerator devices comprises circuitry for determining the present computational load on each accelerator device.

Example 126 includes the subject matter of any of Examples 119-125, and wherein the means for determining acceleration capabilities of the set of accelerator devices comprises circuitry for determining an intercommunication ability of the accelerator devices.

Example 127 includes the subject matter of any of Examples 119-126, and wherein the circuitry for determining an intercommunication ability of the accelerator devices comprises circuitry for determining whether a bus is present between two or more of the accelerator devices.

Example 128 includes the subject matter of any of Examples 119-127, and wherein the circuitry for determining an intercommunication ability of the accelerator devices comprises circuitry for determining whether one of the accelerator devices includes multiple slots that are communicatively coupled to each other.

Example 129 includes the subject matter of any of Examples 119-128, and wherein the circuitry for determining an intercommunication ability of the accelerator devices comprises circuitry for determining an ability of the accelerator devices to access shared virtual memory.

Example 130 includes the subject matter of any of Examples 119-129, and wherein the circuitry for determining an availability of the accelerator devices to accelerate one or more of the tasks comprises circuitry for selecting one or more accelerator devices that satisfy a predefined computational load.

Example 131 includes the subject matter of any of Examples 119-130, and wherein the circuitry for determining an availability of the accelerator devices to accelerate one or more of the tasks comprises circuitry for matching the types of the accelerator tasks to the accelerator device types.

Example 132 includes the subject matter of any of Examples 119-131, and further including circuitry for generating a schedule of executions of tasks on the accelerator devices as a function of the data dependence of the tasks and parallel acceleration features of the accelerator devices.

Example 133 includes the subject matter of any of Examples 119-132, and wherein the circuitry for obtaining an assignment of the accelerator devices to one or more of the tasks comprises circuitry for sending availability data to the compute device, wherein the availability data is indicative of which of the tasks the compute engine has accepted for acceleration on the associated accelerator sled; and circuitry for receiving an assignment of the tasks from the compute device.

Example 134 includes the subject matter of any of Examples 119-133, and further including circuitry for communicating with one or more other sleds to share data associated with the tasks.

The invention claimed is:

1. A compute device comprising:
   an I/O subsystem and
   circuitry to:

receive a request from a compute sled to accelerate execution of a job, wherein the job includes a set of tasks;

analyze the request to generate metadata indicative of the tasks within the job, a type of acceleration associated with each task, and a data dependency between the tasks;

send an availability request to a micro-orchestrator of an accelerator sled communicatively coupled to the compute device, wherein the availability request includes the metadata;

receive availability data from the micro-orchestrator, wherein the availability data is indicative of which of the tasks the micro-orchestrator has accepted for acceleration on an associated accelerator sled; and assign the tasks to the micro-orchestrator as a function of the availability data.

2. The compute device of claim 1, wherein to receive a request to accelerate a job comprises to receive a request that includes code indicative of operations to be performed within the job; and wherein to analyze the request comprises to analyze the code to identify operations to be grouped into tasks.

3. The compute device of claim 1, wherein to analyze the request comprises to determine a type of acceleration for each task.

4. The compute device of claim 1, wherein to analyze the request comprises to determine a data dependence between the tasks.

5. The compute device of claim 4, wherein to determine the data dependence between the tasks comprises determine a subdivision of the tasks to operate on different portions of a data set concurrently.

6. The compute device of claim 1, wherein to receive the request to accelerate a job comprises to receive a request that identifies a workload phase associated with the job; and wherein the circuitry is further to associate the tasks within the job with a workload phase identifier.

7. The compute device of claim 1, wherein to send an availability request to a micro-orchestrator comprises to send the availability request to multiple micro-orchestrators.

8. The compute device of claim 1, wherein to receive availability data from the micro-orchestrator comprises to receive an indication of an estimated time to complete the tasks accepted by a micro-orchestrator.

9. The compute device of claim 1, wherein to receive availability data from the micro-orchestrator comprises to receive an indication of whether an accelerator sled associated with the micro-orchestrator can access a shared memory with another accelerator sled for parallel execution of one or more of the tasks.

10. The compute device of claim 1, wherein the accelerator sled is one of a plurality of accelerator sleds and wherein to assign the tasks to the micro-orchestrator comprises to assign the tasks as a function of a best fit of each associated accelerated sled to the tasks.

11. The compute device of claim 10, wherein to assign the tasks as a function of a best fit of each associated accelerated sled comprises to consolidate tasks on the associated accelerator sleds to reduce network congestion.

12. The compute device of claim 10, wherein to assign the tasks as a function of a best fit of each associated accelerated sled comprises to assign the tasks as a function of estimated time completion of each task.

13. One or more non-transitory machine-readable storage media comprising a plurality of instructions stored thereon that, in response to being executed, cause a compute device to:

receive a request from a compute sled to accelerate execution of a job, wherein the job includes a set of tasks;

analyze the request to generate metadata indicative of the tasks within the job, a type of acceleration associated with each task, and a data dependency between the tasks;

send an availability request to a micro-orchestrator of an accelerator sled communicatively coupled to the compute device, wherein the availability request includes the metadata;

receive availability data from the micro-orchestrator, wherein the availability data is indicative of which of the tasks the micro-orchestrator has accepted for acceleration on an associated accelerator sled; and assign the tasks to the micro-orchestrator as a function of the availability data.

14. The one or more non-transitory machine-readable storage media of claim 13, wherein to receive a request to accelerate a job comprises to receive a request that includes code indicative operations to be performed within the job; and wherein to analyze the request comprises to analyze the code to identify operations to be grouped into tasks.

15. The one or more non-transitory machine-readable storage media of claim 13, wherein to analyze the request comprises to determine a type of acceleration for each task.

16. The one or more non-transitory machine-readable storage media of claim 13, wherein to analyze the request comprises to determine a data dependence between the tasks.

17. The one or more non-transitory machine-readable storage media of claim 16, wherein to determine the data dependence between the tasks comprises determine a subdivision of the tasks to operate on different portions of a data set concurrently.

18. The one or more non-transitory machine-readable storage media of claim 13, wherein to receive the request to accelerate a job comprises to receive a request that identifies a workload phase associated with the job; and wherein the plurality of instructions, when executed, further cause the compute device to associate the tasks within the job with a workload phase identifier.

19. The one or more non-transitory machine-readable storage media of claim 13, wherein to send an availability request to a micro-orchestrator comprises to send the availability request to multiple micro-orchestrators.

20. The one or more non-transitory machine-readable storage media of claim 13, wherein to receive availability data from the micro-orchestrator comprises to receive an indication of an estimated time to complete the tasks accepted by a micro-orchestrator.

21. The one or more non-transitory machine-readable storage media of claim 13, wherein to receive availability data from the micro-orchestrator comprises to receive an indication of whether an accelerator sled associated with the micro-orchestrator can access a shared memory with another accelerator sled for parallel execution of one or more of the tasks.

22. The one or more non-transitory machine-readable storage media of claim 13, wherein the accelerator sled is one of a plurality of accelerator sleds and wherein to assign the tasks to the micro-orchestrator comprises to assign the tasks as a function of a best fit of each associated accelerated sled to the tasks.

23. The one or more non-transitory machine-readable storage media of claim 22, wherein to assign the tasks as a function of a best fit of each associated accelerated sled comprises to consolidate tasks on associated accelerator sleds to reduce network congestion.

24. The one or more non-transitory machine-readable storage media of claim 22, wherein to assign the tasks as a function of a best fit of each associated accelerated sled comprises to assign the tasks as a function of estimated time completion of each task.

25. A compute device comprising:
circuitry for receiving a request from a compute sled to accelerate execution of a job, wherein the job includes a set of tasks;
means for analyzing the request to generate metadata indicative of the tasks within the job, a type of acceleration associated with each task, and a data dependency between the tasks;
circuitry for sending an availability request to a micro-orchestrator of an accelerator sled communicatively coupled to the compute device, wherein the availability request includes the metadata;
circuitry for receiving availability data from the micro-orchestrator, wherein the availability data is indicative of which of the tasks the micro-orchestrator has accepted for acceleration on an associated accelerator sled; and
means for assigning the tasks to the micro-orchestrator as a function of the availability data.

26. A method comprising:
receiving, by a compute device, a request from a compute sled to accelerate execution of a job, wherein the job includes a set of tasks;
analyzing, by the compute device, the request to generate metadata indicative of the tasks within the job, a type of acceleration associated with each task, and a data dependency between the tasks;
sending, by the compute device, an availability request to a micro-orchestrator of an accelerator sled communicatively coupled to the compute device, wherein the availability request includes the metadata;
receiving, by the compute device, availability data from the micro-orchestrator, wherein the availability data is indicative of which of the tasks the micro-orchestrator has accepted for acceleration on an associated accelerator sled; and
assigning, by the compute device, the tasks to the micro-orchestrator as a function of the availability data.

27. The method of claim 26, wherein receiving a request to accelerate a job comprises receiving a request that includes code indicative operations to be performed within the job; and
wherein analyzing the request comprises analyzing the code to identify operations to be grouped into tasks.

28. The method of claim 26, wherein analyzing the request comprises determining a type of acceleration for each task.

* * * * *